Figure 10:
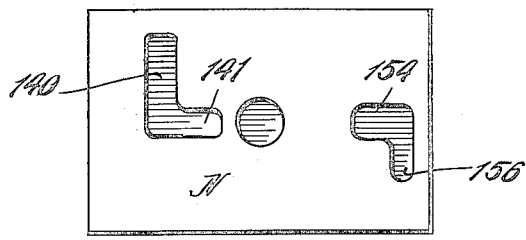

S. G. NEAL.
AIR BRAKE APPARATUS.
APPLICATION FILED NOV. 13, 1918. RENEWED AUG. 30, 1921.

1,411,368.

Patented Apr. 4, 1922.
15 SHEETS—SHEET 1.

Fig. 1.

Inventor
Spencer G Neal
By
Davis Davis
Attorneys

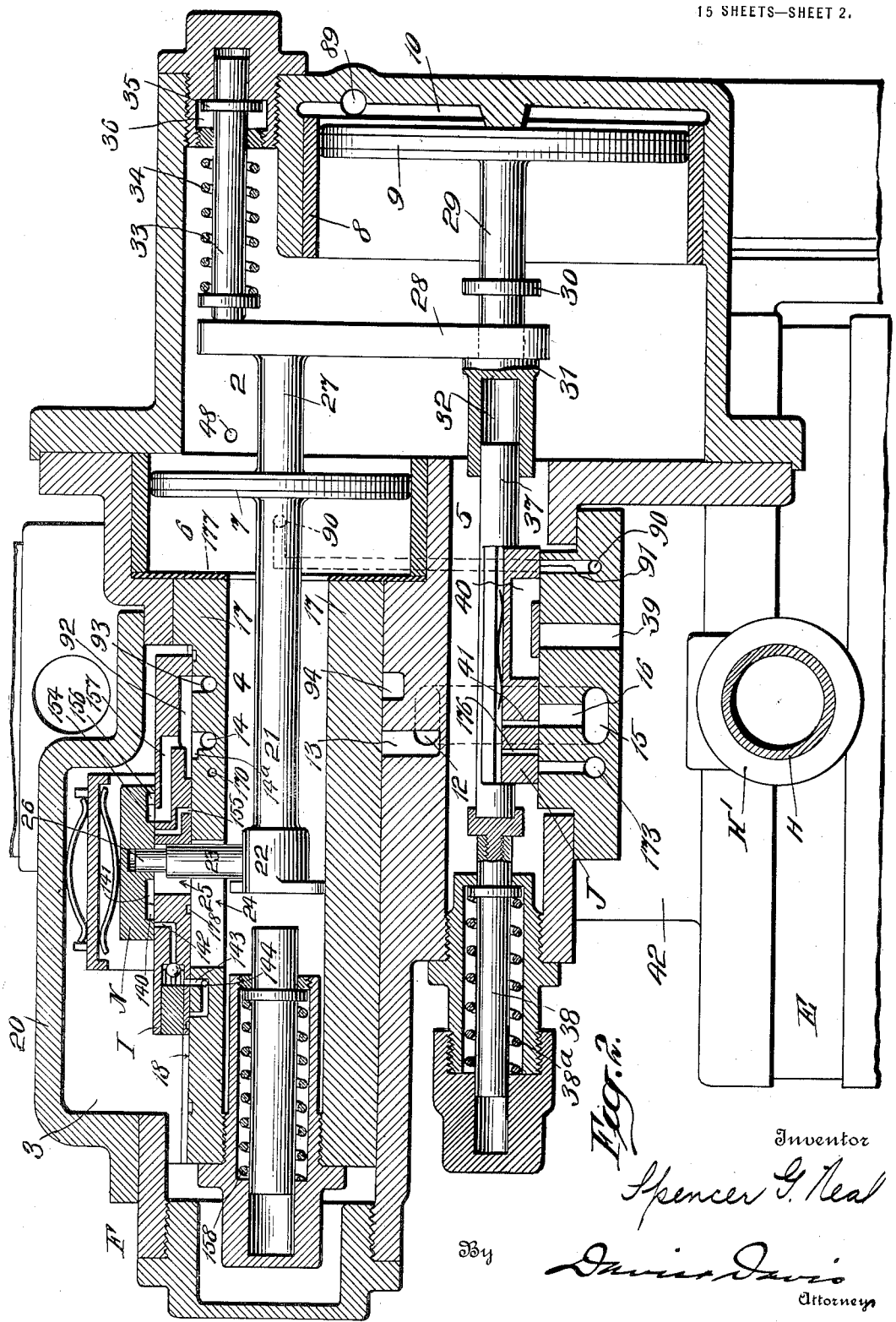

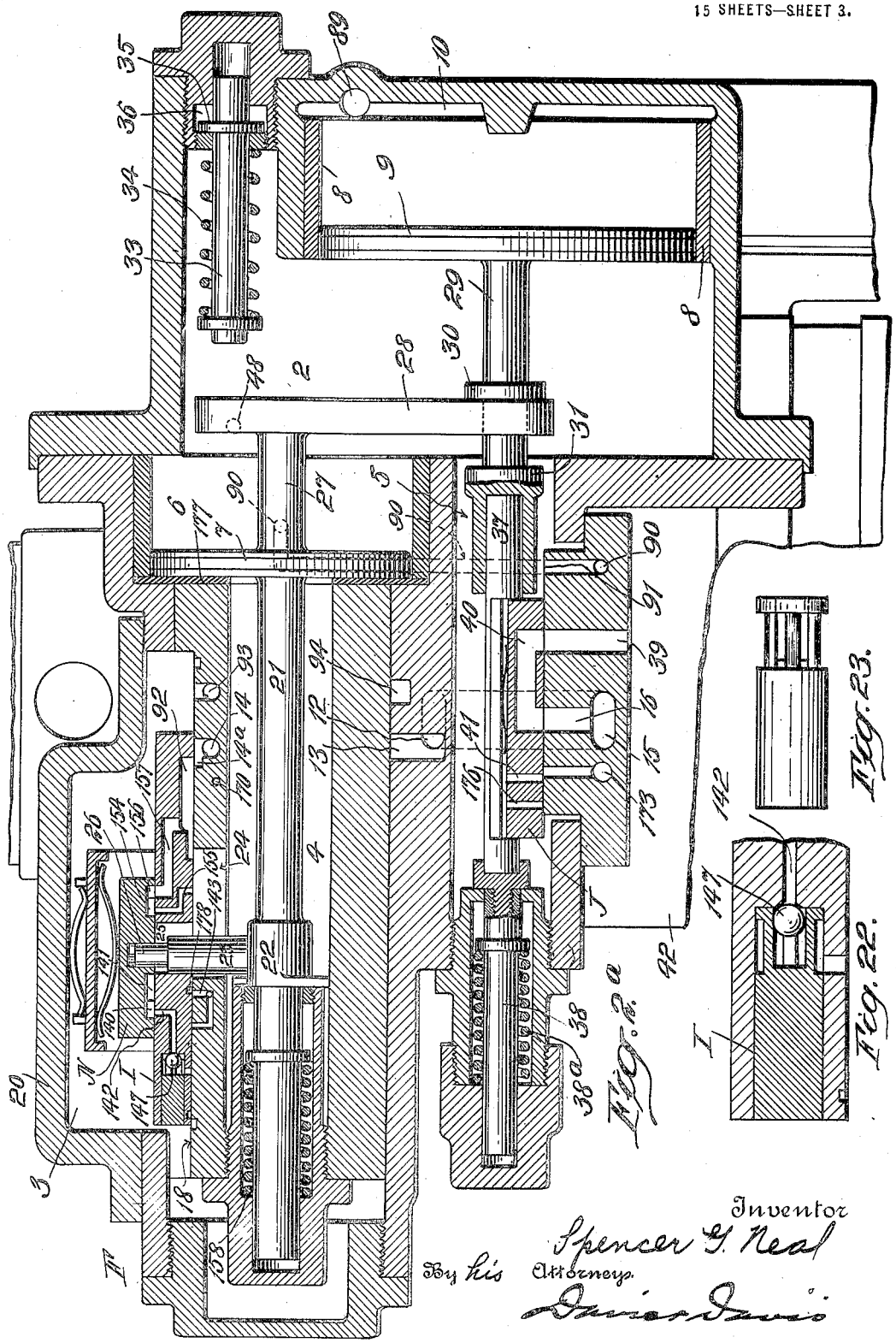

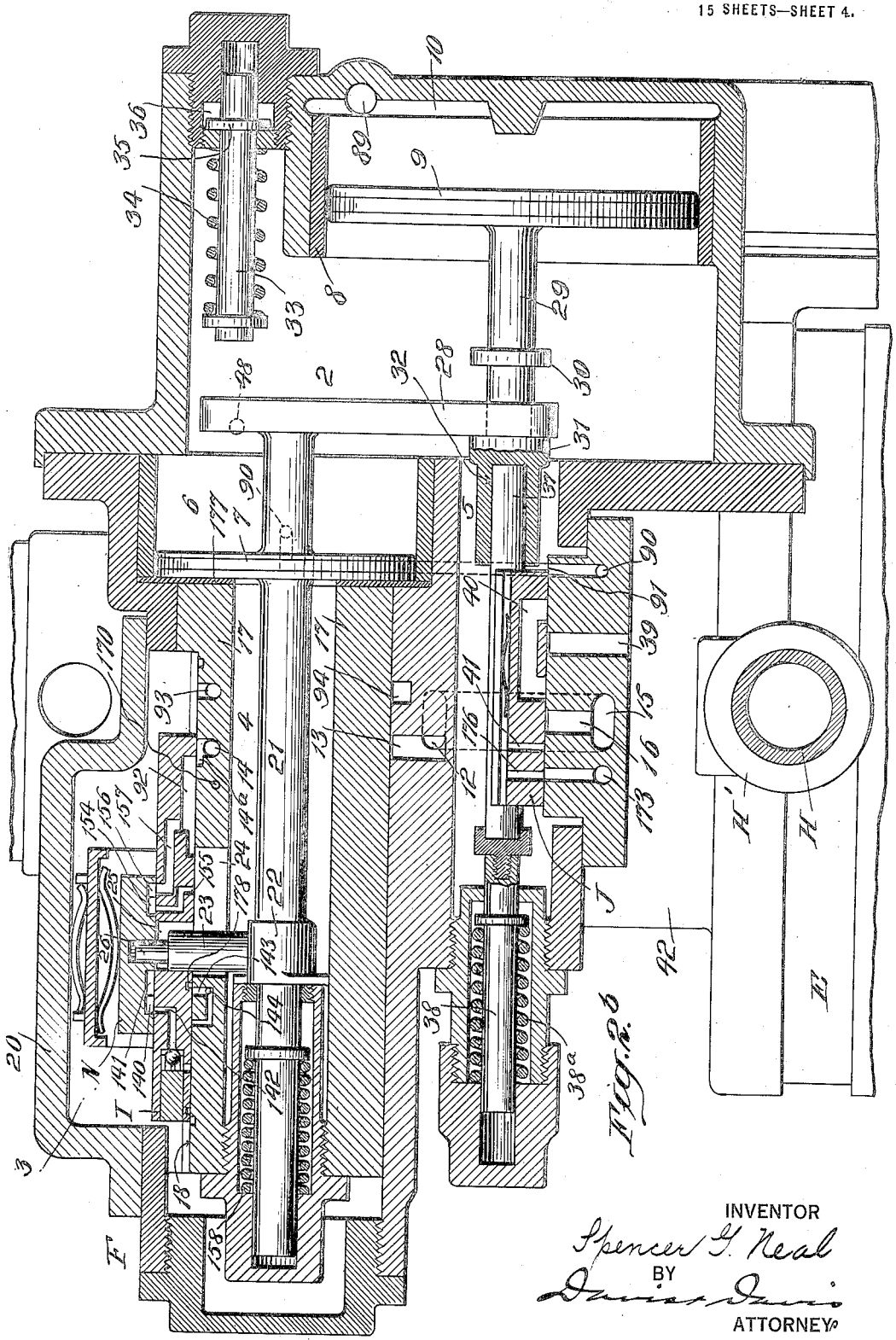

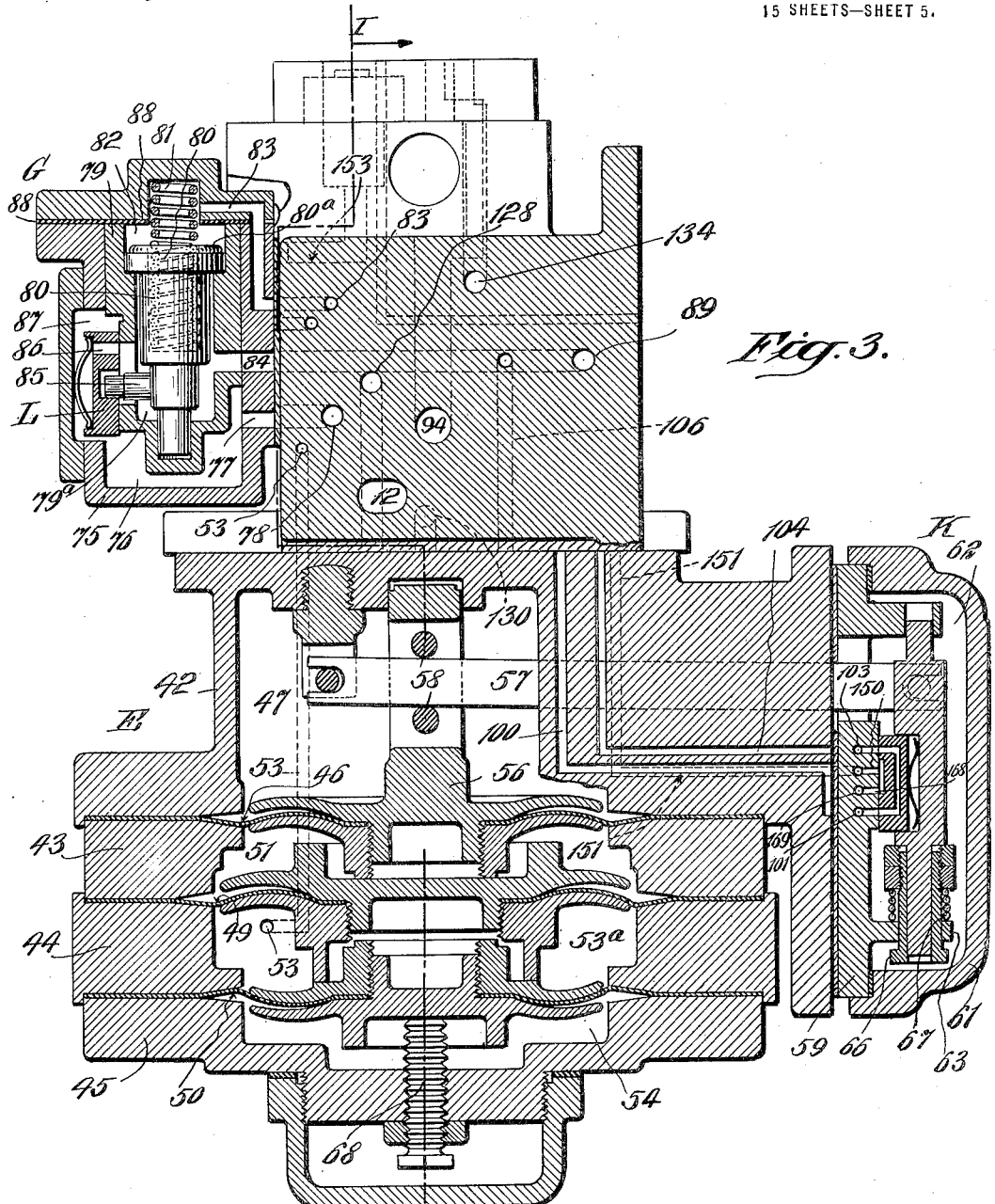

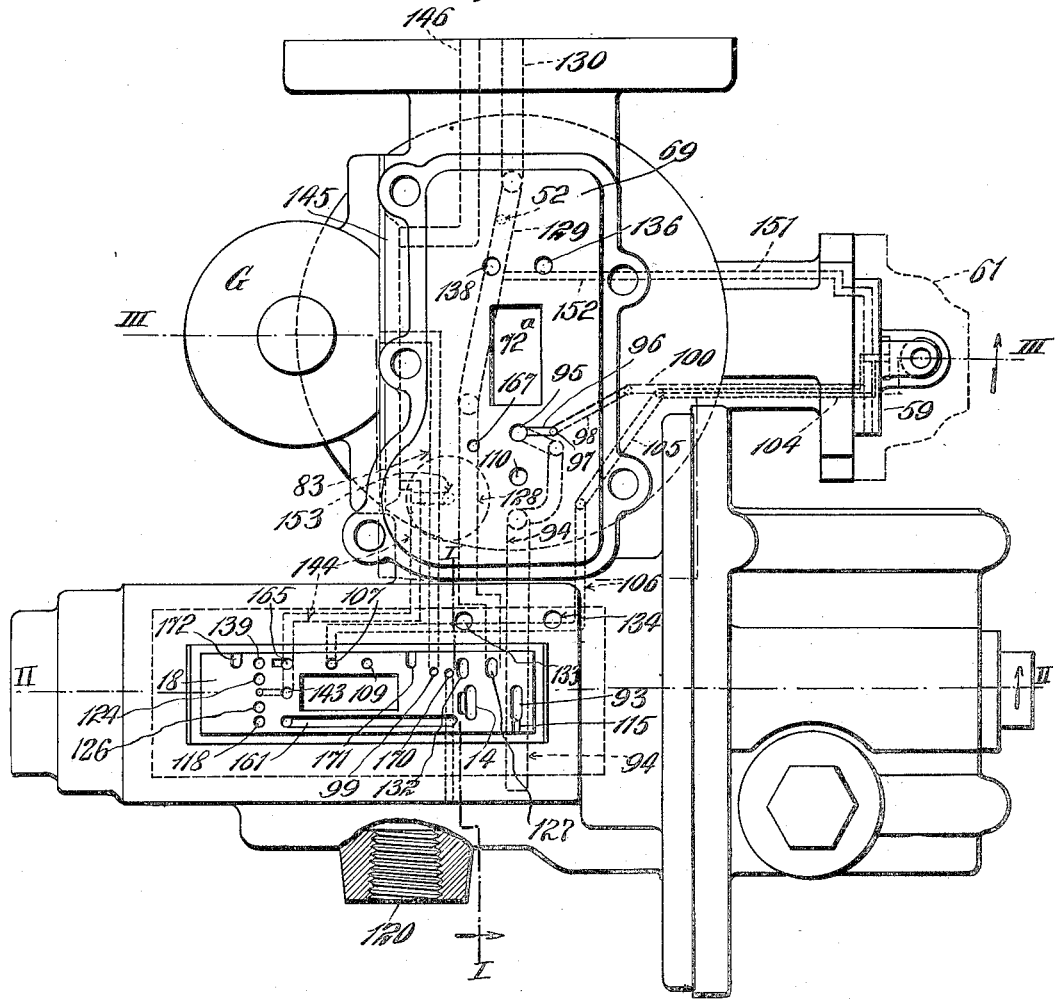

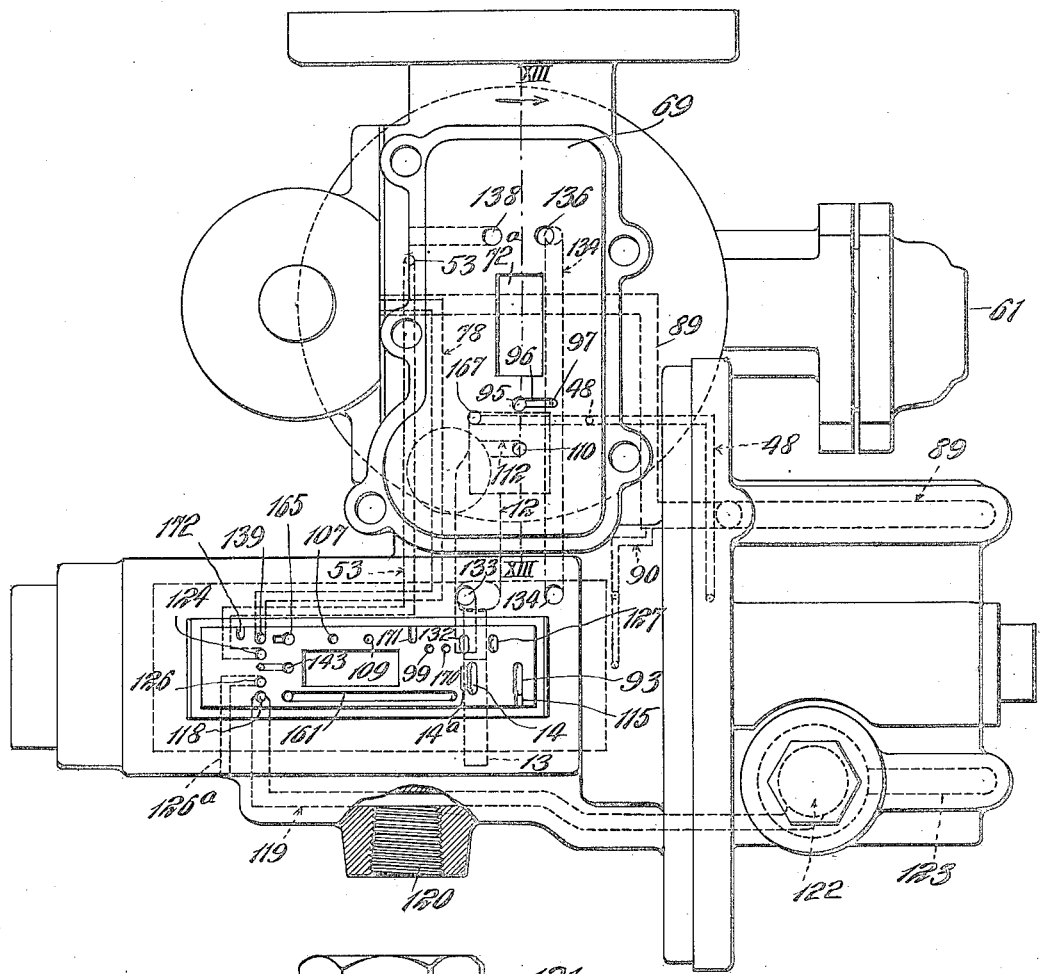

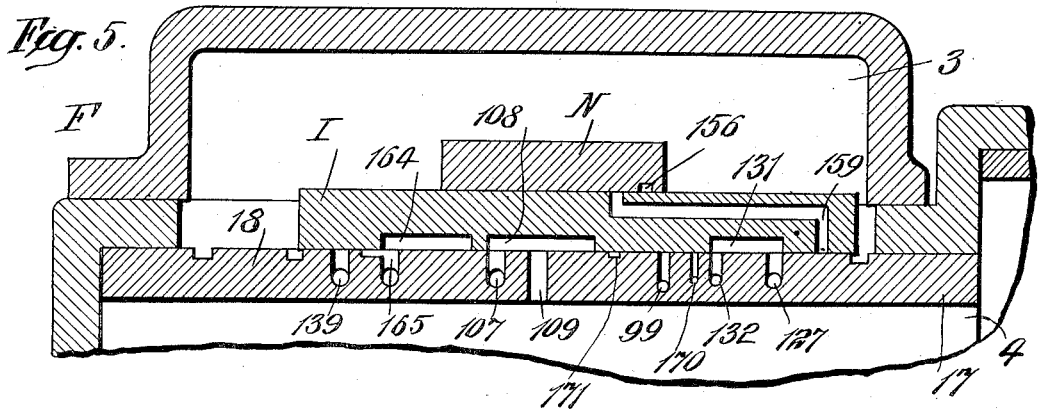
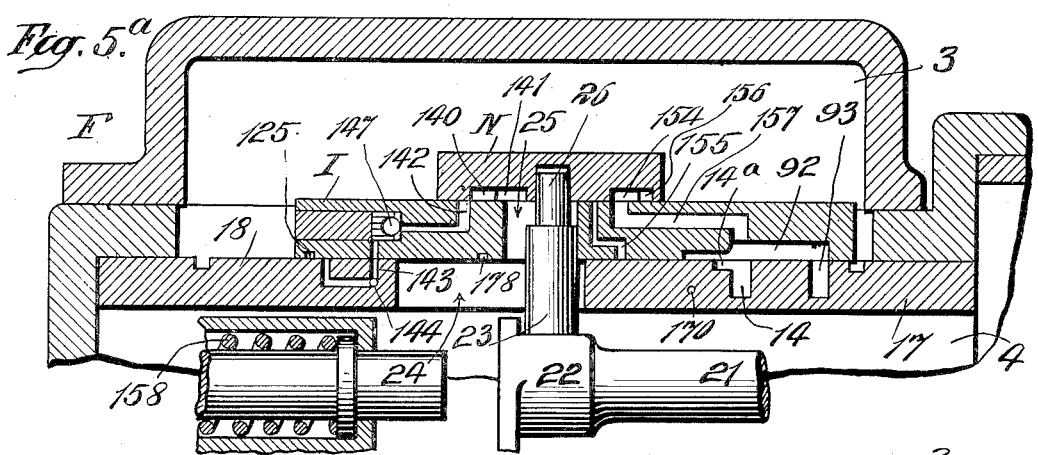
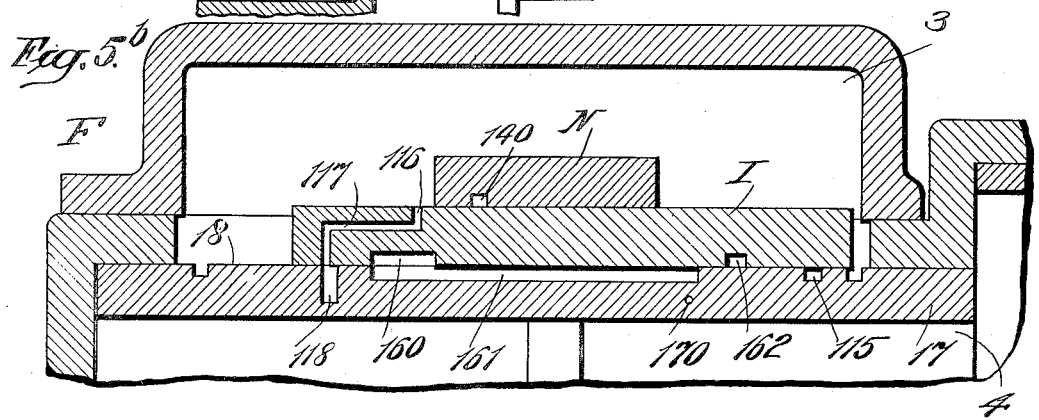
BRAKE PIPE RESERVOIR CHARGING POSITION

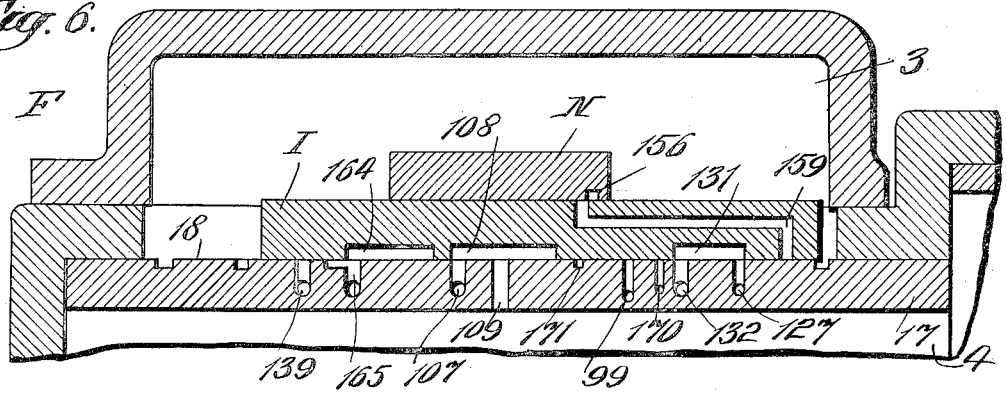
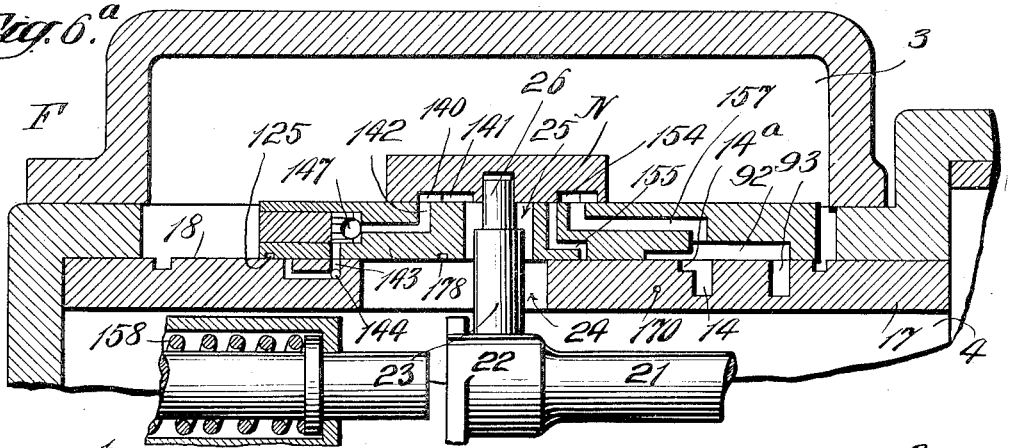
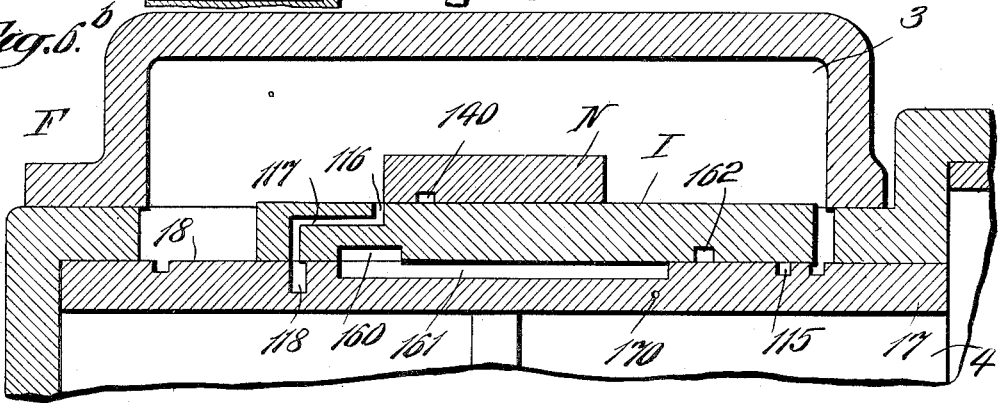
EMERGENCY RESERVOIR CHARGING POSITION

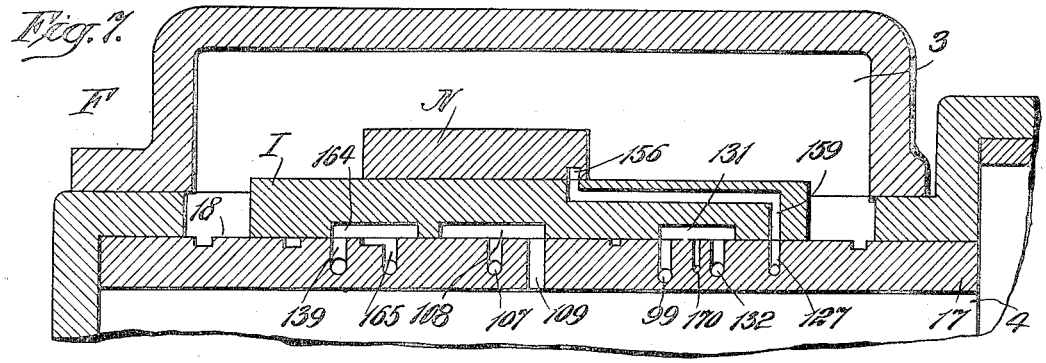
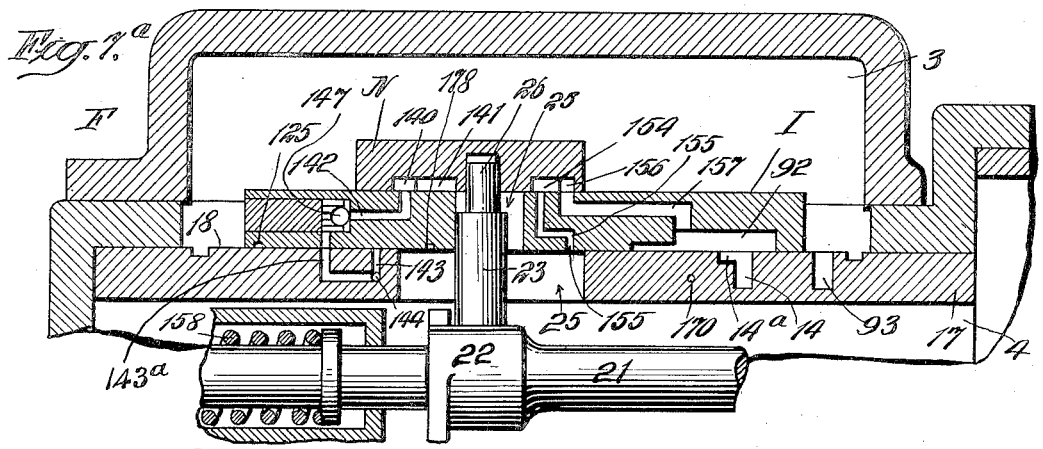
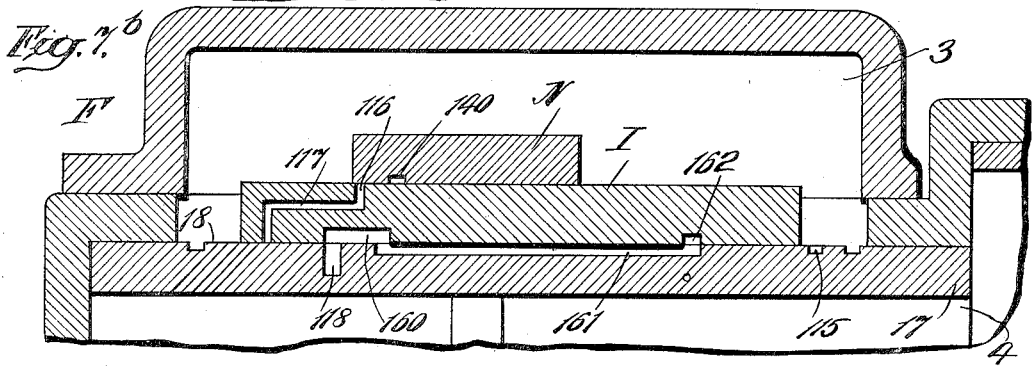
SERVICE APPLICATION POSITION

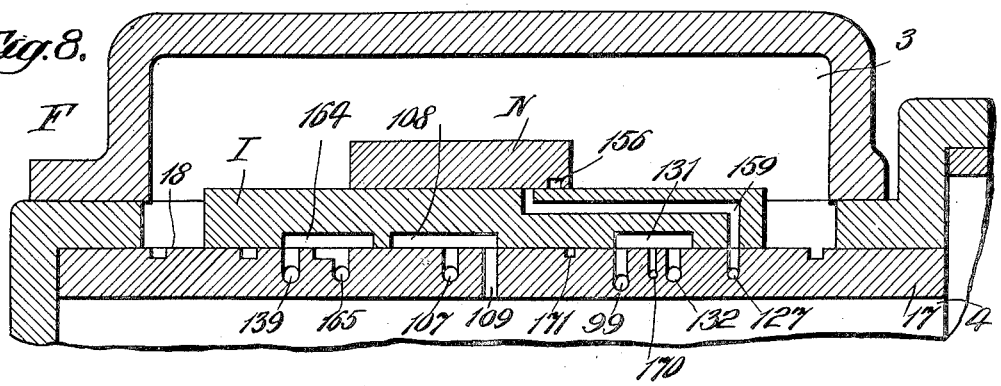
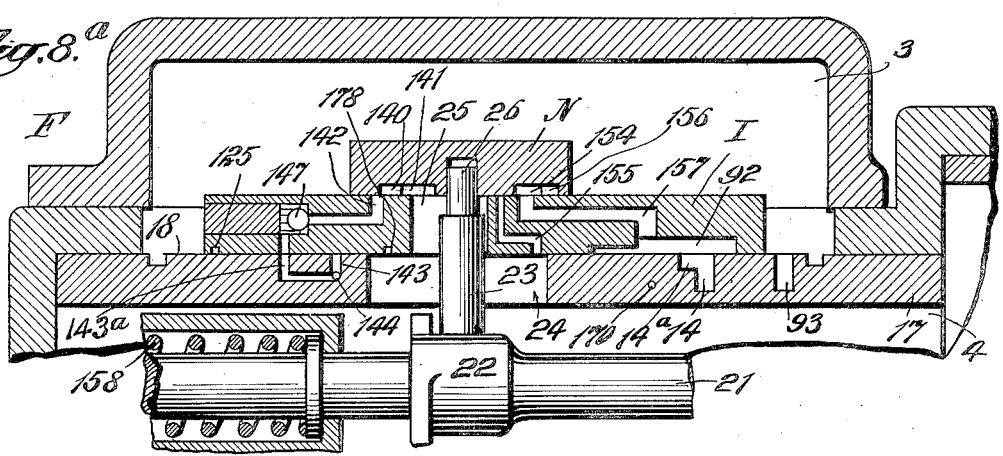
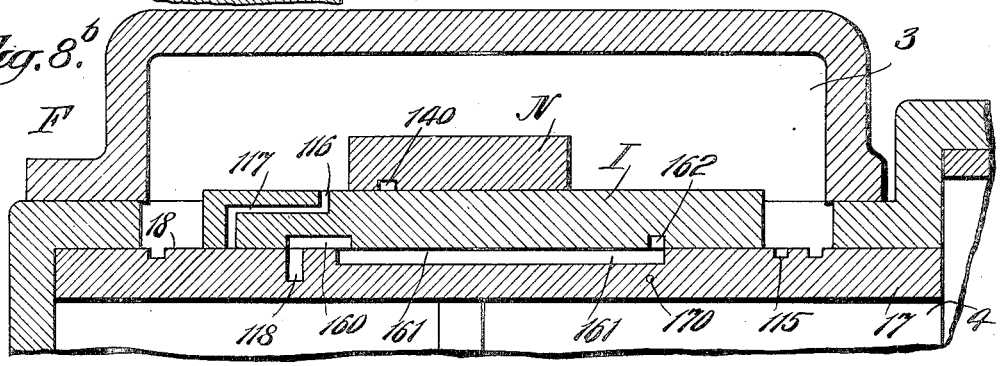
SERVICE LAP POSITION

S. G. NEAL.
AIR BRAKE APPARATUS.
APPLICATION FILED NOV. 13, 1918. RENEWED AUG. 30, 1921.
1,411,368.
Patented Apr. 4, 1922.
15 SHEETS—SHEET 12.
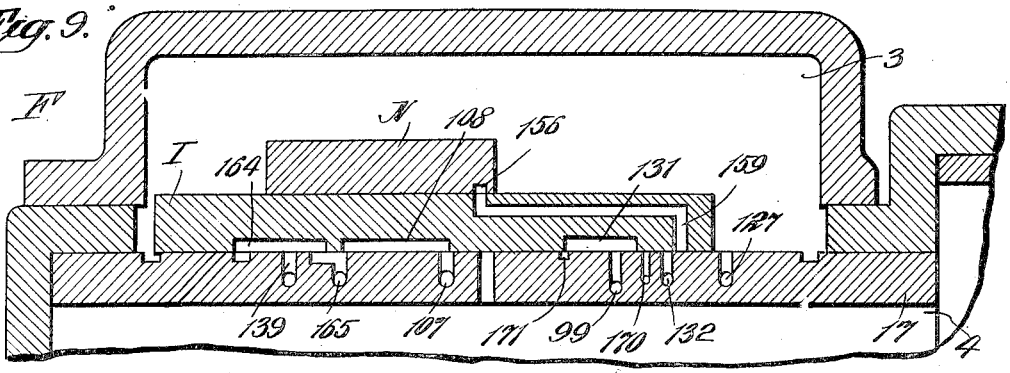
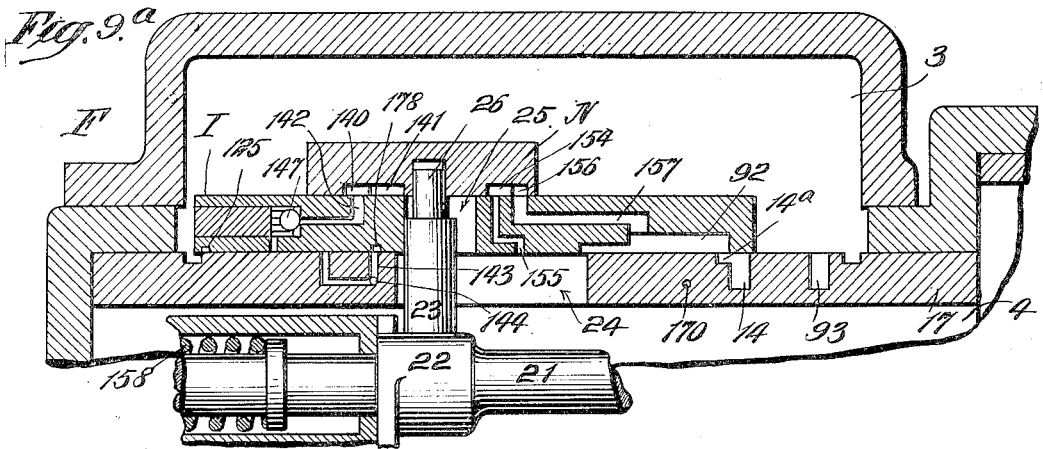
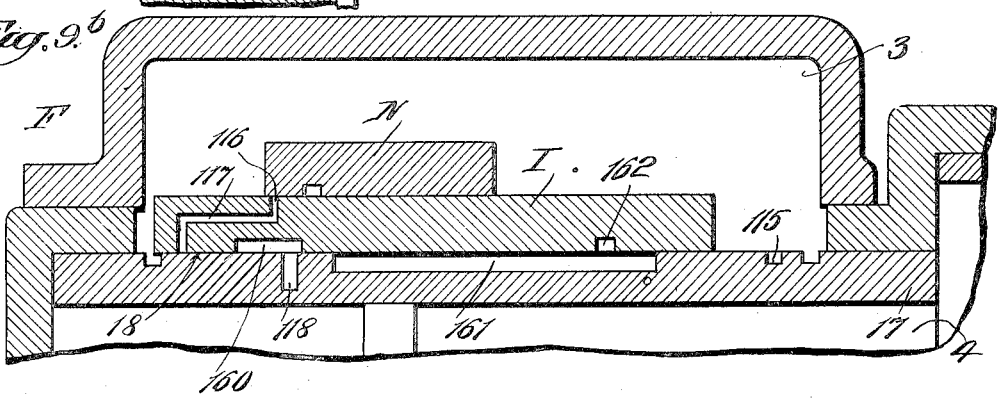
EMERGENCY POSITION
Inventor
Spencer G. Neal
By Attorney Inventor
Spencer G. Neal
By his Attorneys

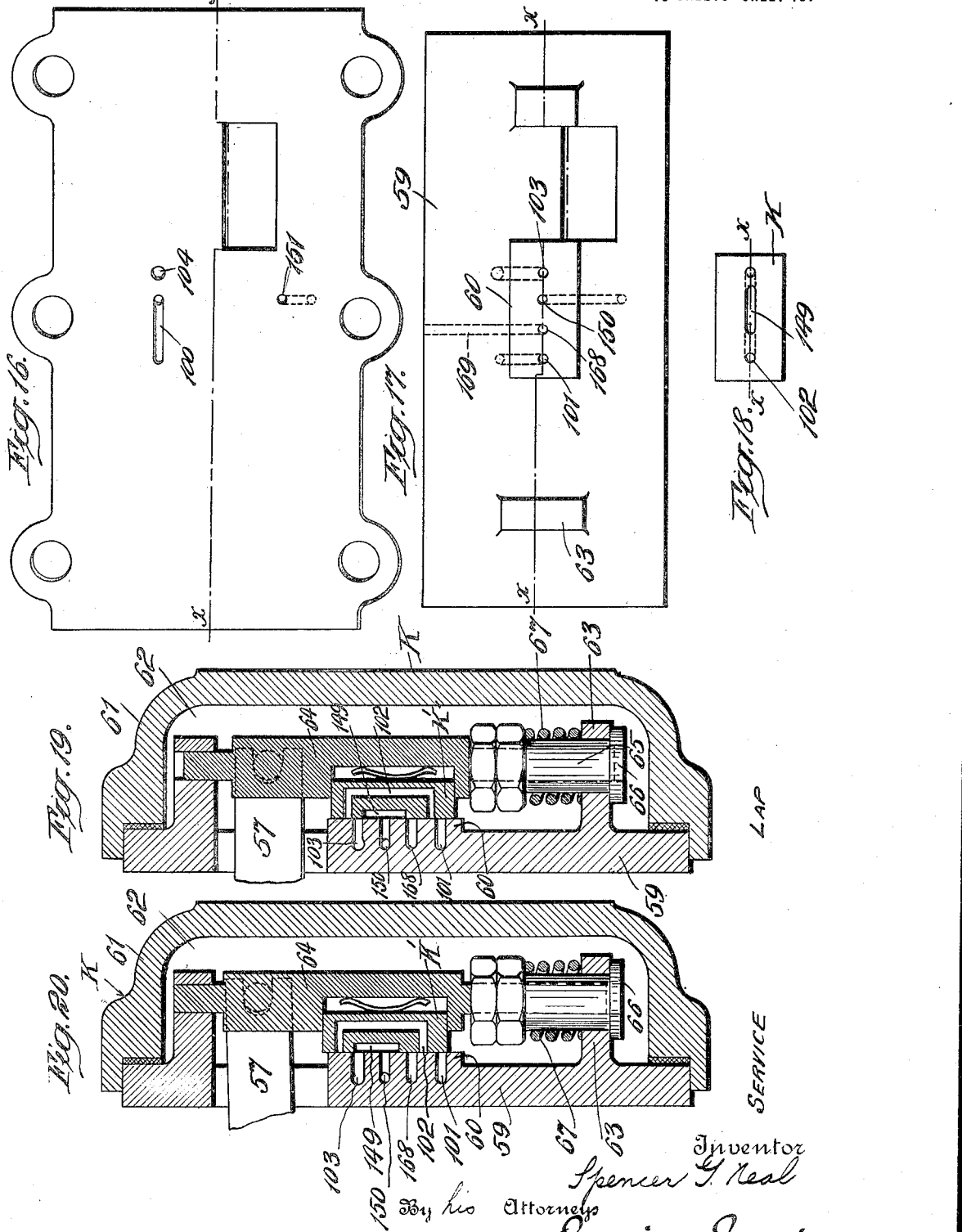

UNITED STATES PATENT OFFICE.

SPENCER GEARY NEAL, OF NEW YORK, N. Y., ASSIGNOR TO AUTOMATIC STRAIGHT AIR BRAKE COMPANY, OF WILMINGTON, DELAWARE, A CORPORATION OF DELAWARE.

AIR-BRAKE APPARATUS.

1,411,368.      Specification of Letters Patent.     Patented Apr. 4, 1922.

Application filed November 13, 1918, Serial No. 262,298. Renewed August 30, 1921. Serial No. 497,045.

*To all whom it may concern:*

Be it known that I, SPENCER G. NEAL, a citizen of the United States, and resident of the borough of Manhattan, city, county, and State of New York, have invented certain new and useful Improvements in Air-Brake Apparatus, (Case #36,) of which the following is a specification.

This invention relates to improvements in that type of air brake apparatus disclosed in Patent No. 1,082,758 dated December 30, 1913, and in Patent No. 1,183,103, dated May 16, 1916, wherein brake pipe air is used for all service applications of the brakes, an emergency reservoir supplying air for emergency applications of the brakes. In the apparatus disclosed in said patents the brake pipe volume is augmented by a brake pipe reservoir which is in open communication with the brake pipe during all service applications of the brakes, and supplies the necessary volume of air for service braking. It is a further characteristic of the apparatus disclosed in the patents mentioned that the brake cylinder pressure controls the movement of the triple valve to lap position, the triple valve operating in all applications of the brakes to admit air to the brake cylinder until a pressure is built up therein having a predetermined ratio to the amount of train pipe reduction, and this regardless of brake cylinder leaks and varying piston travel.

Patent No. 1,183,103, dated May 16, 1916, shows a means whereby the emergency reservoir air may be discharged into the train pipe upon an increase of train pipe pressure to thereby quickly raise the brake pipe pressure for a quick release of the brakes.

The apparatus disclosed in this application has all of the essential functions of the apparatus disclosed in the two patents mentioned herein, and in addition possesses many broadly new principles of operation and features of construction, all of which will be fully pointed out hereinafter.

One of the main objects of this invention is to provide a triple valve having a main actuating piston subject on both sides to brake pipe pressure, means being provided whereby a reduction in brake pipe pressure will exhaust the brake pipe air from one side of said actuating piston, and permit the brake pipe air on the opposite side thereof to exert its full power to move said piston and the main slide valve connected thereto to application position.

Another object of the invention is to provide in a triple valve an actuating piston subject on both sides to brake pipe air, a pilot or controlling valve operating upon a reduction of brake pipe pressure for an application of the brakes to exhaust the brake the brake pipe air from one side of the actuating piston, to thereby permit substantially the full power of the brake pipe air on the opposite side of the piston to move the main actuating piston and the slide valve connected thereto to application position.

Another object of the invention is to provide means whereby when the actuating piston and the main slide valve have been moved to service application position brake pipe air will be again admitted to the exhausted side of the actuating piston to stop the piston and the main slide valve in service position.

Another object of the invention is to provide a triple valve wherein upon a reduction of brake pipe pressure the full power of the reduced brake pipe air will be exerted to move the actuating piston and the main slide valve to application position.

Another object of the invention is to provide in a triple valve a main actuating piston and a main slide valve connected thereto, the piston being held normally between balanced air pressures and means being provided whereby a reduction of brake pipe pressure will cause the substantial exhaust of the air from one side of the actuating piston, thereby permitting the air on the other side thereof to act substantially unopposed and to exert its full power on the actuating piston to move it and its slide valve to service position.

Another object of the invention is to provide means whereby the brake cylinder pressure will control the return of the graduating slide valve from application position to lap position.

A further object of the invention is to provide means whereby the brake cylinder pressure will control means for equalizing the brake pipe pressure on opposite sides of the main actuating piston, and thereby control the movement of the graduating slide valve from application position to lap position.

Another object of the invention is to provide means whereby should the brake cylinder pressure leak down below a predetermined pressure, air from one side of the actuating piston will be exhausted, thereby permitting brake pipe air to move the main slide valve to service position to build up brake cylinder pressure sufficiently to compensate for the leak, said main slide valve being moved back to lap position when the desired brake cylinder pressure is again reached.

Another object of the invention is to provide an automatic emergency pilot valve which will operate when the brake pipe pressure has been reduced to or below a certain degree to bring about an emergency operation of the triple valve.

Another object of the invention is to provide means whereby upon an increase in brake pipe pressure for a release of the brakes the emergency reservoir air will be admitted to one side of the main actuating piston to move said piston and the connected slide valve to full-release position in opposition to the increased brake pipe pressure on the other side of the actuating piston.

Figure 11:
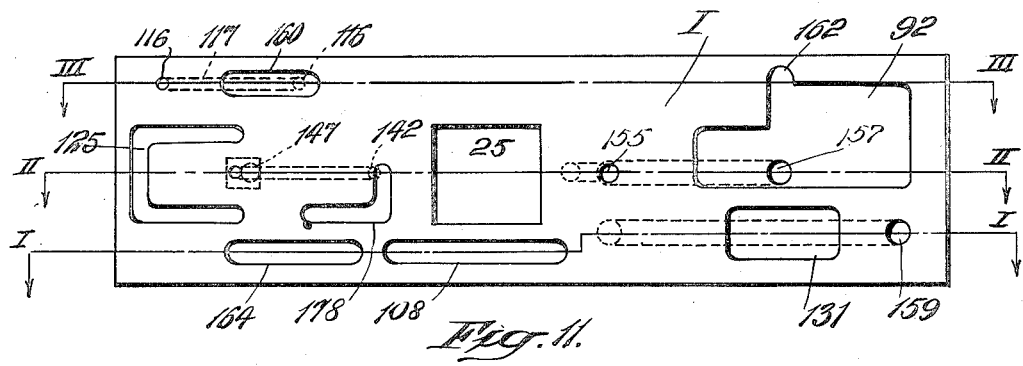
Figure 12:
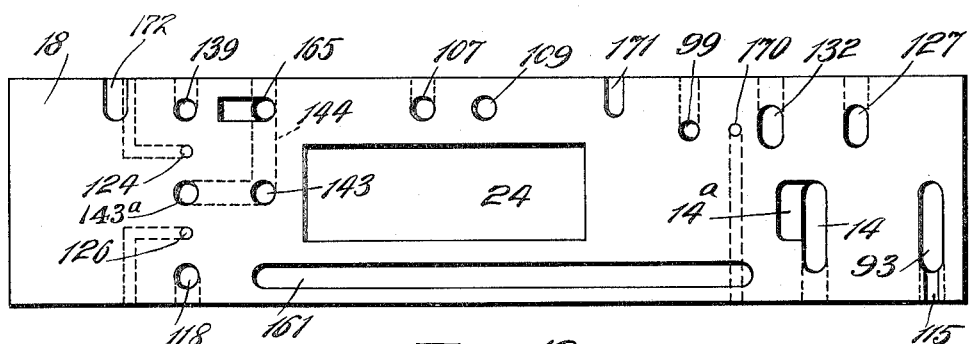
Figure 13:
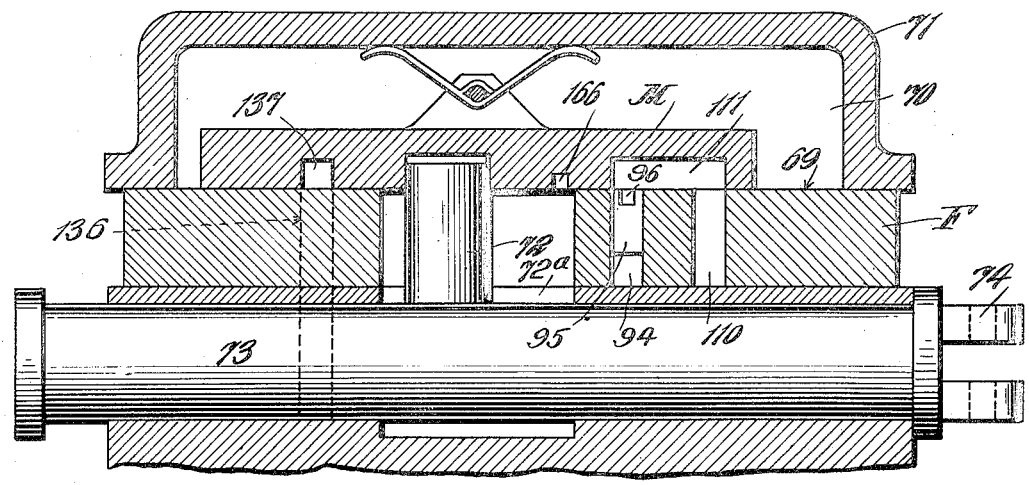
Figure 14:
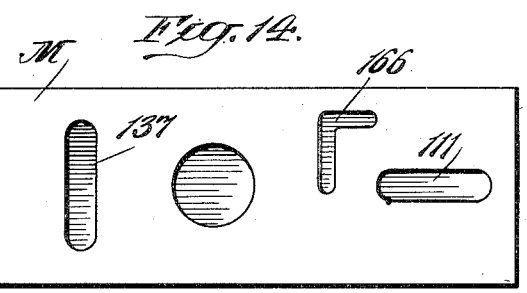
Figure 15:
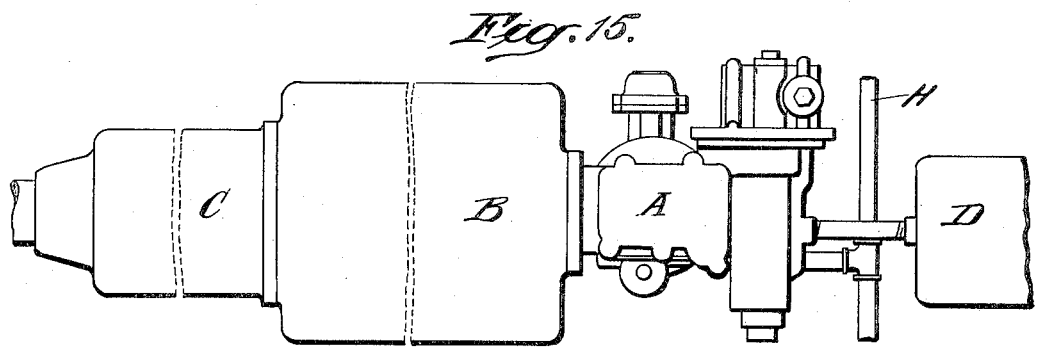

In the drawings, Fig. 1 is a vertical, irregular, sectional view of the triple valve, taken on the lines I—I of Fig. 3, the section of the main slide valve and emergency valve being taken on the line I—I of Fig. 4;

Fig. 2 a section on line II—II of Figs. 1 and 4;

Fig. 2$^a$ the same as Fig. 2, in emergency position;

Fig. 2$^b$ a view similar to Fig. 2, showing the emergency slide valve in its second position;

Fig. 3 an irregular, vertical, sectional view taken on the lines III—III of Figs. 1 and 4, the section of the automatic emergency valve being taken on the line III$^a$—III$^a$ of Fig 1;

Fig. 4 a plan view of the triple valve, the slide valve housings and slide valves being removed to show the valve seats and some of the ports and passages;

Fig. 4$^a$ a similar view showing other ports and passages;

Figs. 5, 5$^a$ and 5$^b$ sectional views of the main slide valve, the graduating valve and the valve seat, taken on the lines I—I, II—II and III—III of Fig. 11, showing the valves in brake pipe reservior charging position;

Figs. 6, 6$^a$ and 6$^b$ are views similar to Figs. 5, 5$^a$ and 5$^b$, showing the valves in emergency reservoir charging position;

Figs. 7, 7$^a$ and 7$^b$ are views similar to Figs. 5, 5$^a$ and 5$^b$, showing the valves in service application position;

Figs. 8, 8$^a$ and 8$^b$ are views similar to Figs. 5, 5$^a$ and 5$^b$, showing the valves in service lap position;

Figs. 9, 9$^a$ and 9$^b$ are views similar to Figs. 5, 5$^a$ and 5$^b$, showing the valves in emergency position;

Fig. 10 a bottom plan view of graduating valve;

Fig. 11 a bottom plan view of main slide valve;

Fig. 12 a plan view of main slide valve seat;

Fig. 13 a vertical, sectional view of the release-governing valve on line XIII—XIII of Fig. 4$^a$;

Fig. 14 a detail bottom plan view of the release governing valve;

Fig. 15 a diagram of apparatus;

Fig. 16 a face view of the pilot valve supporting flange;

Fig. 17 a face view of the pilot valve seat;

Fig. 18 a face view of the pilot valve;

Fig. 19 a vertical sectional view of the pilot valve in lap position on lines X—X of Figs. 16, 17 and 18;

Fig. 20 a view similar to Fig. 19, in service position;

Fig. 21 a detail sectional view showing the check valve between the brake pipe reservoir and the quick-action chamber;

Fig. 22 a detail cross-sectional view of the main slide valve, showing the ball check valve 147; and Fig. 23 a detail view of the ball check valve cage removed from the slide valve.

Referring to the various parts by reference characters, A designates the triple valve body; B the emergency reservoir; C the brake cylinder, and D a brake pipe reservoir (See Fig. 15.)

The triple valve comprises a lower controller section E, which contains the means for controlling brake cylinder pressure; the main slide valve section F, which contains the service and emergency slide valves and the quick-release valve; and the emergency pilot valve section G, which is connected to the main section. (See Fig. 3.)

H designates the brake pipe; I the main or service slide valve; J the emergency slide valve; K the pilot valve controlling the triple valve for service applications of the brakes and the graduated release of the brakes; L the emergency pilot slide valve which controls the automatic emergency operation of the triple valve; and M the release-governing valve by means of which the triple may be adjusted for a graduated release of the brakes or a full, slow release of the brakes, or for a quick, full release of the brakes, and N the graduating valve.

In order to simplify the description, the parts of the apparatus and their functions, and the various ports, passages and valves will be described in detail in connection with the several valve operations.

The main slide valve section of the triple valve body is formed with a main brake pipe chamber 2; a main slide valve chamber 3; a supplemental brake pipe chamber 4; and an emergency slide valve chamber 5, this later chamber being always in open communication with the main brake pipe chamber 2. Intermediate between the main brake pipe chamber 2 and the supplemental brake pipe chamber 4 is formed a cylindrical chamber 6, in which is mounted to reciprocate a main actuating piston 7. Also formed in the main brake pipe chamber, axially in line with the emergency slide valve chamber 5 is a cylindrical chamber 8, in which is fitted to reciprocate an emergency piston 9, said piston forming one wall of a quick-action chamber 10, so that said emergency piston will be subject on one side to brake pipe pressure, and on its other side to the pressure in the quick-action chamber.

The brake pipe H is connected to the lower or controller section of the triple valve at H', and communicates directly with passages 11, 12 and 13, this latter passage extending around the supplemental brake pipe chamber and communicating with a port 14 in the main slide valve seat. Communicating with the passage 12 is a passage 15, which opens through a port 16, in the emergency valve seat, this latter port being in communication with the emergency slide valve chamber at all times through a port in the emergency slide valve, except when said valve is moved to emergency position, as will be fully hereinafter set forth. Brake pipe pressure will be registered in the main brake pipe chamber 2, and the emergency slide valve chamber 5, and the main actuating piston 7 and the emergency piston 9 will be subject to brake pipe pressure during all positions of the triple valve other than emergency.

The emergency piston is larger in area than the main actuating piston. As shown in the drawings, the area is about twice that of the main actuating piston. This greater area is for a purpose which will fully hereinafter appear.

The supplemental brake pipe chamber is fitted with a bushing 17, the upper surface of this bushing forming the main slide valve seat 18, through which the port 14 is formed. On the seat 18 is mounted the main slide valve I. On top of the main slide valve is mounted the graduating valve N, this latter valve being held to its seat by a spring bearing thereon and retained in the usual housing in the slide valve chamber 3, (Fig. 2). The main slide valve is also held to its seat by a suitable spring. The main slide valve chamber 3 is closed by a cap plate 20. The valve seat and the main and graduating valves are formed with ports and passages, which will be specifically described when setting forth the several operations of the triple valve, and a description of these ports is omitted at this point in order to simplify the description of the general construction of the triple valve.

The main actuating piston is formed with a concentric stem 21, which extends into the hollow portion of the bushing 17, and is formed at its inner end with a guide head 22, which engages the interior of the bushing and serves to accurately guide the piston stem and the piston. The head 22 is provided with an upwardly extending post 23, which extends through a slot 24 in the main slide valve seat, and into a slot 25 in the main slide valve. The slot 24 is of sufficient length to permit of the full movement of the piston stem; and the slot 25 in the main slide valve is of sufficient length to permit the piston to move the graduating valve a limited distance without moving the main slide valve. The post 23 is provided with an upwardly extending reduced portion 26, which engages a recess in the under side of the graduating valve. It is manifest that the graduating valve will be first moved by the actuating piston, and that when the lost motion is taken up in the slot 25, the post 23 will engage the main slide valve and thereafter the two valves will move together.

The main actuating piston is also provided with a stem 27, which extends outwardly into the brake pipe chamber 2, and carries at its free end a depending cross-head 28. The emergency piston 9 is provided with a central operating stem 29, the inner end of which extends into the emergency slide valve chamber. The emergency piston stem extends through an aperture in the lower end of the cross-head 28, and is formed on opposite sides of said cross-head with stops 30 and 31; the stop 30 is in the form of a collar, and the stop 31 is in the form of a head having an axial bore or opening 32. (See Fig. 2.) There is a space between the two stops sufficient to permit of a limited independent movement of the connected parts, as will be more fully hereinafter described. The upper end of the cross-head 28 engages the inner end of a replacing plunger 33, which is normally maintained extended into the path of the said cross-head by a replacing spring 34. One end of the replacing plunger is formed with a head 35, which is adapted to reciprocate in a chamber 36, the inner wall of said chamber forming a stop for the plunger head to limit the movement of the plunger under the tension of the replacing spring. When the replacing spring is compressed through the action of the main actuating piston and the cross-head carried thereby, the plunger head 35 will engage the outer wall of the chamber 36 and thereafter the plunger will form a rigid stop for the main actuating piston.

The emergency slide valve J is mounted between abutments formed on the emergency valve stem 37, and is held to its seat by a flat spring arranged between the said stem and the upper surface of said valve. One end of the emergency valve stem fits and slides in the axial bore 32 of the head 31, and there is sufficient lost motion between these parts to permit the main actuating piston to move the main slide valve to service position without operating the emergency valve. The inner end of the emergency valve stem is connected to a spring-pressed plunger 38, which normally holds the emergency slide valve in position on its seat and returns the said valve to normal position after an emergency application of the brakes when the pressures on opposite sides of the emergency piston have equalized, as will be more fully hereinafter described. The emergency valve seat is formed with a brake pipe exhaust port 39; and the emergency slide valve is formed with a passage 40, which is adapted to place the exhaust port in direct communication with the brake pipe port 16, to vent the brake pipe direct to atmosphere for an emergency application of the brakes, and when the emergency slide valve is moved to emergency position. The emergency slide valve is also formed with a port 41, which at all times, except in the emergency position of the valve, is in direct communication with the brake pipe port 16, so that brake pipe pressure will be always registered in the emergency slide valve chamber 5 and the main brake pipe chamber 2, except as above stated.

The controller section E of the triple valve comprises the main body casting 42, which is formed with a flange at its upper end by means of which it is bolted to the under side of the main slide valve section F. The lower end of this casting 42 is provided with a horizontal circular flange to the under side of which is bolted a spacing ring 43, and to this spacing ring is bolted another spacing ring 44, and to the lower end of the section is bolted a cap plate 45. Between the flange on the lower end of the casting 42 and the spacing ring 43 is secured an actuating diaphragm 46, said diaphragm forming the lower wall of an actuating chamber 47, this chamber being in direct open communication with the main brake pipe chamber 2 through passage 48, so that brake pipe pressure will be always registered in the actuating chamber and on the upper side of the actuating diaphragm 46. Between the spacing rings 43 and 44 is secured a controlling diaphragm 49, this diaphragm being larger in area than the actuating diaphragm 46. Between the lower side of the spacing ring 44 and the upper side of the cap plate 45 is secured an emergency diaphragm 50. All of these diaphragms are provided with independent central rigid heads which bear against each other at all times, so that the three diaphragms always move together. Between the actuating diaphragm and the controlling diaphragm is formed a brake cylinder controlling chamber 51, which is in communication with the brake cylinder through the passage 52, as will be more fully hereinafter described. The chamber 53ᵃ between the controlling diaphragm and the emergency diaphragm is vented to atmosphere through passage 53 at all times, (see Fig. 3,) except when the valve is in emergency position, as will be fully herein set forth. Chamber 54 below the emergency diaphragm is in communication with the emergency reservoir through passage 55, so that emergency reservoir pressure will be always registered in said chamber, as will fully hereinafter appear.

The head of the actuating diaphragm 46 is formed with a central upwardly extending stem 56, which extends through the actuating chamber, its upper end being guided in a socket formed in the upper wall of said chamber. This stem is slotted transversely and through said slot extends a substantially horizontal operating lever 57, a pair of pins 58 connecting said lever to the stem. The left-hand end of the lever 57 is pivoted on a fulcrum block mounted in the actuating chamber; the right-hand end of said lever extending through a suitable slot in the controller section and into the casing of the pilot valve K, said lever being of sufficient length to provide an adequate movement of the pilot valve with a very slight movement of the actuating diaphragm.

The pilot slide valve K' is moved in response to variations in pressure in the brake pipe and controls the charging of the brake pipe reservoir and emergency reservoir; service applications of the brake; the graduated release of the brakes; the graduated application of the brakes; the slow, full release of the brakes, and the quick, full release of the brakes. This valve comprises a plate 59, on the outer face of which is formed the pilot valve seat 60; and to said plate is secured a housing 61, this latter forming pilot valve chamber 62. The pilot slide valve K' reciprocates vertically on valve seat 60, and is mounted between abutments or shoulders formed on the pilot valve stem 64, and is held to this seat by a flat spring, as shown clearly in Fig. 3. The right-hand end of the lever 57 is connected to the stem 64, so that the pilot valve will be moved by said lever in response to the movements of the diaphragms 46, 49 and 50. The upper end of the valve stem is guided in a rigid block; and the lower end thereof slides in a vertically arranged sleeve 65, said sleeve being adapted to reciprocate vertically in a stud 63 formed on the valve plate 59. The sleeve 65 is provided on its upper end with screw collars which are adapted to be engaged by the shouldered valve stem; and the lower end of said sleeve is provided with a collar 66, which is adapted to engage the rigid stud 63 on the valve plate to limit the upward movement of said sleeve. A spring 67 is interposed between the rigid stud of the valve plate and the collars on the upper end of the sleeve, and normally holds the stop collar 66 against the rigid stud 63. The sleeve is slidable in the stud 63, and the valve stem is independently slidable in the sleeve for purposes which will fully hereafter appear.

The pilot valve and its seat are provided with ports and passages by means of which its various functions are secured, and these ports and passages will be fully described when describing in detail each operation of the valve.

Through the cap plate 45 (see Fig. 3) is screwed an adjustable stop 68 to limit the downward movement of the diaphragms. The upward movement of the diaphragms is limited by the upper end of the stem 56, engaging the bottom of the guiding socket formed in the upper wall of the actuating chamber.

The release governing valve M, (Figs. 1, 13 and 14) which controls the graduated release or the quick release of the brakes is mounted to slide on a horizontal valve seat 69 formed on the top of the main slide valve section F, the release valve chamber 70 being formed by a housing 71. The release valve is connected to a post 72, which extends upwardly through a slot 72ª, from a reciprocatable rod 73, mounted in a suitable housing in the main valve section, and provided at one end with coupling lugs 74, to which a suitable operating rod may be secured. This valve is designed to be shifted manually into its quick-release or graduated-release position. When the valve is in position to secure a quick release of the brakes, it is shifted to the position shown in Fig. 13, and then places the emergency reservoir in communication with the brake pipe through passage 110, groove 111 and port and passage 95 when the main slide valve is moved to release position by an increase of brake pipe pressure. When the release-governing valve is shifted to its graduated-release position this communication between the emergency reservoir and the brake pipe is closed, and the groove 137 is disconnected from ports 136 and 138, and the release of the brakes will take place wholly through the pilot valve. The ports and passages connected with the release valve will be fully described in connection with the quick-release operation of the triple valve.

The emergency pilot valve (as shown in Fig. 3) is designed to automatically cause the triple valve to move to emergency position should the brake pipe pressure, through any cause, leak down or be reduced to an abnormal and unsafe degree. In a triple valve operating to admit brake pipe air to the brake cylinder for service applications of the brakes, it is desirable to provide means to automatically bring about an emergency application of the brakes, should the brake pipe pressure be so reduced as to afford insufficient braking power for the safe control of the train. The automatic emergency pilot valve provides means whereby when the brake pipe pressure, and of course the brake pipe reservoir pressure which is in direct communication with the brake pipe, is abnormally reduced by slow reductions, the triple valve will be moved to emergency position to bring about an emergency application of the brakes. This valve comprises a valve casing 75, adapted to be secured to a vertical face of the main slide valve section, said casing forming a chamber 76 near its lower end, which is in communication through port 77 and connected passage 78, with a port 139 in the main slide valve seat. In the valve casing 75 is arranged a piston casing 79, in which is mounted a piston 80, said piston being held in its normal, lower position by means of a compression spring 81, said spring being arranged in a chamber 82 above the piston, as shown clearly in Fig. 3. The chamber 82 is connected through port 83 and the connected passages with a port 99 in the main slide valve seat. The chamber 79ª below the piston 80 is connected by port 84 and passages 89 to the quick-action chamber 10 and through a passage 90 to a port 91 in the seat of the emergency slide valve, (Figs. 4ª and 2ª) so that brake pipe reservoir pressure and the quick-action chamber pressure will be always registered in said chamber 79ª. A valve L slides on a seat formed on the outer side of the main piston casing 79, and said valve is connected to the piston 80 by a stem 85. The emergency pilot slide valve L is formed with a port 86, which normally communicates through a suitable passage with the interior of the chamber 79ª. The said pilot valve is mounted in a valve chamber 87, which chamber is in open communication with the chamber 76 formed at the bottom of the valve chamber, this latter chamber being in communication with the port 77. When the brake pipe pressure is reduced abnormally the pressure in the chamber 79ª will be sufficiently reduced to permit the spring 81 to lower the piston 80 and the connected valve L to the position shown in Fig. 3, thereby placing the chamber 76 in communication with the quick-action chamber 10 through port 86, port 84, and passage 89, thereby moving the emergency piston to emergency position against the reduced brake pipe pressure in chamber 2.

The piston 80 is provided with a rib 80$^a$ which is adapted to engage a gasket 88 to seal the piston chamber and prevent pressure in chamber 79$^a$ leaking around the piston 80 into chamber 82.

It will be understood that the usual variations in brake pipe pressure to effect the operation of the triple valve are secured through the operation of the engineer's brake valve, said valve being moved in the usual manner to service, lap, full-release and charging, and emergency positions to secure corresponding results in the triple valve.

*Charging brake pipe reservoir.*

(See Figs. 1, 2, 5, 5$^a$ and 5$^b$.)

In charging the system the brake pipe pressure is raised in the usual manner. Air flows from the brake pipe through the brake pipe connection H′ through passages 11, 12 and 13, to port 14 in the seat of the main slide valve. From passage 12 air flows through passage 15 to port 16 in the seat of the emergency slide valve; and from said port it flows through the port 41 in the emergency slide valve, into the emergency slide valve chamber 5, and thence directly into the main brake pipe chamber 2. From chamber 2 the air flows through port 48 directly into the actuating chamber 47. From port 14 of the main slide valve seat the air flows into groove 92 of the main slide valve which, in the charging position, as shown in Figs. 5$^a$ and 2, places port 14 in communication with port 93, this latter port communicating through passage 94 with port 95 in the release-governing valve seat 69. Port 95 communicates through groove 96, passages 97, 98 and 100, port 101 of the pilot valve seat, through passage 102 of the pilot valve, port 103, passages 104, 105 and 106, to port 107 of the main slide valve seat, and then through groove 108 of the main slide valve to port 109 of the main slide valve seat, this latter port being in direct open communication with the chamber 4, so that brake pipe pressure will be built up on both sides of the actuating piston 7.

The emergency valve J will be normally held in the positon shown in Fig. 2, by the emergency spring 38$^a$, so that the port 41 will be maintained in communication with the port 16.

The brake pipe pressure admitted to chamber 2 will move the large emergency piston 9 to the right, thereby moving stop 30 away from the operating cross-head 28, and bringing the head 31 into engagement with said cross-head; but this movement of the piston 9 will not cause any movement of the emergency valve J. It is manifest that because of the larger area of the emergency piston 9 the actuating piston 7 will be moved to charging position in opposition to the pressure on the right-hand side of said piston, and the main slide valve I will be moved into charging position, shown in Figs. 2, 5, 5$^a$ and 5$^b$.

Assuming the release-governing valve to be in position to secure a quick release of the brakes, as illustrated in Fig. 13, the port 95 of the quick-release valve seat will be in open communication with port 110, through the groove 111 of the release-governing valve, so that air from port 95 will flow to port 110, and from said port will flow through passage 112 into chamber 113 above the check valve 114. (See Fig. 1.)

A groove 115 in the main slide valve seat places port 93 in communication with the interior of the main slide valve chamber 3, so that brake pipe air will flow into said chamber above the main slide valve and the graduating valve to hold said valves to their seats. The main slide valve is provided with a port 116 in its upper face and in open communication with the chamber 3, said port communicating through a passage 117 with a port 118 in the main slide valve seat, this latter port communicating through a passage 119 with the brake pipe reservoir connection 120, and thence to said reservoir through a suitable pipe connection. Passage 119 also communicates with a check valve chamber 121, said chamber being in communication past check valve 122 and through passage 123 with the quick action chamber 10. Check valve 122 seats upwardly as shown in Fig. 21, and is spring pressed to permit air to flow from the brake pipe reservoir past said valve into the quick-action chamber 10; but prevents air flowing back from the quick-action chamber to the brake pipe reservoir. A small leak port 122$^a$ is formed through the check valve to permit of a slow equalization of pressures in the brake pipe reservoir and the quick-action chamber after the check valve has been seated by its actuating spring. This port will also permit the pressure in the quick-action chamber to slowly leak down to equalize with the pressure in the brake pipe reservor.

Air flowing into chamber 47 from brake pipe chamber 2 through passage 48 will move the diaphragms 46, 49 and 50 to their lower positions, shown in Figs. 1 and 3. This downward movement of the diaphragms will swing the lever 57 on its pivot and lower the pilot valve K′ to the position shown in Fig. 3, thereby opening communication between the ports 101 and 103, through the passage 102 of the pilot valve, thereby permitting brake pipe air to flow from port 95 and passage 100, as hereinbefore described, to the supplemental brake pipe chamber 4 through passage 107, groove 108 and port 109.

The superior pressure in chamber 2 will move the emergency piston 9 to the right sufficiently to compress the replacing spring 34 and hold the head 35 of the replacing plunger against its back stop. The pressure in chamber 2 will, during the charging operation, be superior to the pressure in the quick-action chamber 10. The spring 34 will be held under compression during the charging operation until the pressure in the quick-action chamber 10 has equalized with the pressure in chamber 2. When this has taken place spring 34 will force to the left the replacing plunger and carry with it the cross-head 28 and the actuating piston, this movement continuing until the head 35 engages its forward stop. This movement of the actuating piston will not affect the main slide valve, but will move the graduating valve to the position shown in Figs. 6, 6$^a$ and 6$^b$, in which position the charging of the emergency reservoir will take place, as will be hereinafter described.

The atmospheric chamber 53$^a$, during the charging of the apparatus, is vented to atmosphere through passage 53, shown in Figs. 3 and 4$^a$, said passage communicating with port 124 in the main slide valve seat 18. The main slide valve is formed with a U-shaped groove 125 in its under side, one end of which communicates with the port 124, the other end communicating with a port 126 in the valve seat, this latter port leading direct to atmosphere through passage 126$^a$, as shown clearly in Fig. 4$^a$. It is manifest, therefore, that during the charging operation, chamber 53$^a$ will be vented to atmosphere through the main slide valve seat. The port 125 is U-shaped, as shown, in order to maintain communication between the ports 124 and 126 in all positions of the main slide valve, except the emergency position, as will be hereinafter described. The purpose of this is to maintain chamber 53$^a$ open to atmosphere at all times, except during an emergency application of the brakes, at which time brake cylinder pressure is admitted to chamber 53$^a$.

The main slide valve seat is provided with a brake cylinder port 127, which communicates with the brake cylinder through passages 128, 129 and 130, and the usual pipe connection which extends through the emergency reservoir to the brake cylinder. In the charging position of the main slide valve, as shown in Fig. 5, the brake cylinder port 127 is in communication with a release groove 131, this groove communicating with an exhaust port 132. The exhaust port 132 communicates through passages 133, 134, and 135 formed in the housing 20 (see Fig. 1), to port 136 of the release-governing valve seat 69. In the quick-release position of the governing valve, port 136 is in communication through a groove 137 with release port 138, which is in open communication with the atmosphere or leads to the usual retaining valve. When the release-governing valve is in graduated-release position to cause the release of the brakes to take place through the pilot valve, ports 136 and 138 are blanked or closed, so that a release of brake cylinder pressure cannot take place through ports 127 and 132 when the main slide valve is in full-release position. Likewise ports 95 and 110 will be out of communication to prevent a release of the emergency reservoir to the brake pipe.

Brake pipe reservoir pressure flows from quick-action chamber 10, through passage 89 to the port 84 of the emergency pilot valve and into chamber 79$^a$ thereof. The spring 81 normally holds the piston 80 in the position shown in Fig. 3, so that air may flow from chamber 79$^a$ through port 86 into chamber 87 and thence through port 77 and passage 78 to the port 139 of the main service slide valve seat, said port in the charging position of the valves being closed by the slide valve I. (See Fig. 5.) Air from chamber 79$^a$ will leak past the piston 80 and equalize in chamber 82, so that the spring 81 will hold the piston and the pilot slide valve L in the position shown in Fig. 3, this being the charging and release position of this valve. Port 99 of the slide valve seat which leads to the spring chamber 82 through passage 83 is also closed. Air will leak around piston 9 into chamber 10, and will then flow to brake pipe reservoir through port 122$^a$ in check valve 122. The flow through the port 122$^a$ will prevent a quick equalization of pressures on opposite sides of piston 9.

*Emergency reservoir charging position.*

(See Figs. 6, 6$^a$ and 6$^b$.)

During the charging of the brake pipe reservoir and the various brake pipe chambers in the triple valve in communication therewith, no air is admitted to the emergency reservoir. The charging of the emergency reservoir is controlled by groove 140 and groove extension 141 of the graduating valve and port 142 of the main slide valve, and these ports are out of register when the valves are in their initial or first charging position and when air is flowing to the brake pipe reservoir. When the pressures on opposite sides of the emergency piston 9 have equalized, due to the brake pipe reservoir being fully charged, the replacing spring 34 will move the actuating piston and the graduating valve N to the position shown in Figs. 6, 6$^a$ and 6$^b$, as previously described. In this position of the valves, brake pipe pressure will flow from chamber 4, (which is in communication with the brake pipe as previously described) to the emergency reservoir through the operating slot 25 in the main slide valve into the extension 141 of groove 140 on the under side of the graduating valve, through groove 140 to the emergency reservoir charging passage 142 of the main slide valve, this latter port communicating with a port 143 in the main slide valve seat. Port 143 is connected through passage 144, groove 145 and passage 146 to the emergency reservoir. A ball check valve 147 is provided in passage 142 in the main slide valve to prevent emergency reservoir air passing back through the passages just described to the chamber 4. Air will continue to flow from chamber 4 to the emergency reservoir until there is an equalization of pressures in said reservoir and in chamber 4; and of course, there will be an equalization of pressures in chamber 4, chamber 2, brake pipe reservoir, and the brake pipe. It is manifest, therefore, that the emergency reservoir cannot be charged until there has been an equalization of pressures in the brake pipe, in the brake pipe reservoir, and quick-action chamber 10, and that the emergency reservoir can only be charged after such equalization of pressures. This effectually prevents an overcharge of the emergency reservoir, even at the head end of the train, where, during the charging operation, the brake pipe pressure is frequently considerably higher than the normal running pressure. The time required to fully charge the brake pipe reservoirs and then the emergency reservoirs is, in the practical operation of the brakes, far beyond the period of excessive brake pipe pressure maintained for charging and full release operations, so that the brake pipe pressure will be reduced to the normal running pressure before the emergency reservoirs are fully charged. This will insure the emergency reservoirs being charged only to the desired normal running brake pipe pressure, even though an excessive brake pipe pressure may be used temporarily for quick release and charging operations.

The emergency reservoir chamber 54 of the pilot-valve-controlling means is in communication with emergency reservoir passage 146, through port and passage 55 and groove 148, so that emergency reservoir pressure will at all times be registered in said chamber 54. When the brake pipe and emergency reservoir pressures have equalized the pressures in chambers 47 and 54 will likewise become equal, and a balance of pressures will have been established between the actuating diaphragm 46 and the emergency diaphragm 50. This will permit the spring 67 to move upwardly the sleeve 65 of the pilot valve until the stop 66 engages the lug 63. This movement of the said sleeve will cause a movement of the pilot valve stem, and the pilot valve, and place the pilot valve in lap position, thereby closing all of the ports of the pilot valve. This lap position of the pilot valve is shown in Fig. 19.

Should there be an overcharge of the brake pipe reservoir during the period of excessive brake pipe pressure, there will be a temporary slight reapplication of the brakes and then an automatic release, and in this way the excess pressure in the brake pipe reservoir will be relieved through the brake cylinder to atmosphere, and the said reservoir pressure will be automatically reduced to equalization with the normal running brake pipe pressure. This temporary application of the brakes and release takes place in the following manner: When the brake pipe is reduced to normal running pressure the excessive pressure in the brake pipe reservoir and in the quick-action chamber 10 will move the piston 9 to the left against the reduced, and normal, brake pipe pressure in chamber 2, and the main slide valve and the graduating valve will be carried to service position. The excessive pressure in the brake pipe reservoir will then flow to the brake cylinder through port 118, groove 160, groove 161, lateral extension 162 of groove 92, and thence through passage 157, groove 156 of the graduating valve, passage 159 of the main slide valve to brake cylinder port 127. At this time the excessive pressure will also flow back to the brake pipe from groove 92 through brake pipe port 14, and the slight increase in brake pipe pressure, due to this flow of air, will be immediately registered on both sides of the actuating piston 7. During this period of excessive pressure the pilot valve will be in release position, due to the fact that the pressures in chambers 51 and 47 combined are superior to the emergency reservoir pressure in chamber 54. The pilot valve being in release position, the brake cylinder pressure will be relieved through groove 129 and connected groove 152, passage 151, port 150, groove 149 of the pilot valve K', and release port 168. This release of air from the brake cylinder will continue through the pilot valve, as described, until there has been an equalization of pressures in the brake pipe and in the emergency reservoir, resulting in a corresponding equalization of pressures in chambers 47 and 54, whereupon the spring 67 will move the pilot valve to lap position.

*Service application position.*

(See Figs. 7, 7ª and 7ᵇ.)

To effect a service application of the brakes the brake pipe pressure is reduced the desired amount in the usual way through the engineer's brake valve. This results in a corresponding reduction of pressure in chamber 2 and in the actuating chamber 47, this latter chamber being in open communication with the chamber 2 through port 48 as herein described. The reduction of pressure in chamber 47 below the emergency reservoir pressure in chamber 54 will permit the pressure in this latter chamber to move the diaphragms upwardly. The pilot valve lever 57 will be swung upwardly on its pivot and the pilot valve will be moved from lap position to service application position, as shown in Fig. 20. A release groove 149 of the pilot valve K' will then open communication between port 103 and port 150, which port is in communication with the brake cylinder through passages 151, 152, 129 and 130. Port 103 is in communication with chamber 4 through ports 104, 105, 106, port 107 of the main slide valve seat, groove 108 of the main slide valve and port 109 in the main slide valve seat, this latter port opening directly into chamber 4 as shown clearly in Figs. 3, 4 and 7. The pressure in chamber 4, therefore, will flow to the brake cylinder and will be reduced to zero or substantially so. This will remove practically all of the pressure from the left-hand or inner side of the actuating piston 7 and will permit the full pressure of air in chamber 2 to move the actuating piston to the left into service-application position, as shown in Figs. 7, 7ª and 7ᵇ. This movement of the main slide valve will uncover port 93 in the main slide valve seat and permit emergency reservoir pressure to be maintained in the main slide valve chamber 3 through passage 146, groove 145, passage 153, past check valve 114 into chamber 113, through passage 112 to port 110 (see Fig. 4ª) in the seat of the release-governing valve. From this port air will flow into the groove 111 of the governing valve (Fig. 13) and thence into port 95 of the governing valve seat, and from this latter port through passage 94 to port 93 of the main slide valve seat, and thence into chamber 3. The purpose of this is to provide an adequate pressure in chamber 3 to hold the main slide valve and the graduating valve to their seats.

The movement of the graduating valve N to the extreme left of its travel as shown in Figs. 7, 7ª and 7ᵇ, places groove 154 of said graduating valve in communication with port 155 in the main slide valve, this latter port being in open communication, in this position of the main slide valve, with the chamber 4. The groove 154 is also at this time in communication with a port 157 of the main slide valve, this latter port being extended from groove 92 of the main slide valve, said groove being in communication with the brake pipe port 14 of the main slide valve seat. In this position of the valves brake pipe air will flow from port 14 through groove 92, extension port 157, graduating valve groove 154 and main slide valve port 155, into chamber 4 (see Fig. 7ª). This will result in an immediate approximate equalization of pressures in chamber 4 and in main brake pipe chamber 2, and the actuating piston will be arrested and the main slide valve held in service position. The inward movement of the actuating piston will have been sufficient, however, to slightly compress the service lap spring 158. The spring 158, however, is not of sufficient strength to act as a stop for the piston 7 and the main slide valve, for the reason that the actuating piston is moved inwardly to service position by the full force of the brake pipe pressure in chamber 2 and, of course, the spring 158 could not be of sufficient strength to resist such pressure and it is only by an approximate equalization of pressures on opposite sides of the actuating piston that the movement of said piston is arrested. The movement of the piston, however, has been sufficient to slightly compress the service lap spring 158.

As shown in Fig. 7, the lateral extension 156 of the graduating valve groove 154 is in communication with an application port 159 in the main slide valve, this latter port being in register with the brake cylinder port 127 of the main slide valve seat so that brake pipe pressure will flow from port 14 directly to the brake cylinder through port 127. As shown in Fig. 7ᵇ, brake pipe reservoir port 118 of the main slide valve seat is in communication with a groove 160 of the main slide valve, this latter groove registering with groove 161 of the main slide valve seat. The main slide valve is formed with an extension 162 of groove 92, said extension being in communication with the groove 161 so that brake pipe reservoir air will flow directly from port 118 to groove 92 and thence through port 159 to the brake cylinder port 127, so that in service applications of the triple valve the brake pipe and brake pipe reservoir will be in free and open communication and air will flow from both of said sources to the brake cylinder for a service application of the brakes. The check valve 147 in the main slide valve will prevent emergency reservoir air passing back to chamber 4 through passage 142 and groove 140 and extension groove 141. As shown in Fig. 7, port 99 is open to atmosphere through release groove 131 and exhaust ports 132 and 170. Port 132 leads directly to atmosphere only when the release-governing valve is adjusted for quick-release operations, and the retainer is turned down. Port 99 is connected through passage 83 with the chamber 82 above the piston 80 of the emergency pilot valve, so that in the service-application position of the slide valve said chamber 82 will be vented to atmosphere, thereby permitting the pressure in chamber 79ª to move piston 80 and the slide valve L upward against the tension of spring 81 to thereby close port 86. In this position of the piston 80 the gasket 88 seals the chamber 79ª and prevents air therein escaping around piston 80 to the atmosphere through passage 83 and connected port 99. In this position of the emergency pilot valve air from emergency reservoir is admitted to chamber 87, through passage 78, port 139 of the main slide valve seat, groove 164 of the main slide valve, port 165 of the main slide valve seat, this latter port being in communication with the emergency reservoir through passage 144, groove 145, and passage 146 (see Figs. 3, 4ª and 7).

The brake cylinder is connected to the equalizing chamber 51 through passages 129 and 52, Figs. 1 and 4, and brake pipe and brake pipe reservoir air will continue to flow to the brake cylinder until sufficient pressure has been built up in chamber 51 to move the pilot valve to lap position. The equalizing diaphragm 49 is of larger area than the actuating diaphragm 46 so that the pressure in chamber 51 will exert its energy downward toward emergency reservoir diaphragm 50, and pressure will continue to be built up in chamber 51 until the excess pressure on diaphragm 49, plus the reduced brake pipe pressure in chamber 47 operating on diaphragm 46, overcomes the undisturbed emergency reservoir pressure in chamber 54. When this over-balancing pressure is obtained the diaphragms will be lowered and the pilot valve will be moved to lap position, thereby cutting off the release of air from chamber 4. This will result in an immediate equalization of pressures in chambers 2 and 4, brake pipe air flowing from port 14, through ports and passages 92, 157, 156, 154 and 155 to chamber 4; brake pipe air flowing to chamber 2 through port 41 of the emergency valve as before described. The service lap spring 158 then will move the graduating valve to lap position, as shown in Fig. 8, closing communication between the brake pipe and the brake cylinder. As shown in Fig. 8 the port extension 156 will be moved out of register with the supply passage 159, this latter passage being blanked by the graduating valve, but port 140 will not be moved entirely out of register with 142.

If a further reduction of brake pipe pressure be made, resulting in a reduction of pressure in chamber 47, the pressure in chamber 54 will overcome the pressures in chambers 51 and 47 and the pilot valve will be operated to again reduce the pressure in chamber 4. This will permit the brake pipe pressure in chamber 2 to again move the graduating valve to service position, resulting in the building up of pressure in the brake cylinder and in chamber 51 to create an energy against diaphragm 49 equivalent to that lessened in chamber 47 against diaphragm 46, at which time the pilot valve will again assume lap position, and in turn the piston 7 and parts connected therewith will be moved to lap position.

If the brake cylinder pressure should leak down the pressure in chamber 51 will be likewise reduced and the undisturbed emergency reservoir pressure in chamber 54 will again move the pilot valve to service position to vent chamber 4 to the brake cylinder and permit the graduating valve to be moved to service position to supply the pressure in the brake cylinder lost through the leak. In this manner the triple valve is operated by emergency reservoir pressure to maintain the desired brake cylinder pressure, brake pipe air being used for this purpose and the brake cylinder pressure being the governing pressure which controls the compensation for brake cylinder leakage.

It is manifest that by repeated reductions of brake pipe pressure the brake cylinder pressure may be built up step by step to any desired pressure up to the full equalization of brake pipe and brake cylinder. It is also manifest that the brake cylinder pressure may be maintained by merely maintaining the brake pipe pressure; and also that the brake cylinder pressure will be uniform without regard to the length of the brake cylinder piston travel and without regard to brake cylinder leaks.

During all service applications of the brakes chamber 53ª is vented to atmosphere through passage 53, ports 124, 125 and 126.

*Quick release.*

With the release-governing valve in position for securing a quick release of the brakes, as shown in Fig. 13, ports 136 and 138 will be in communication with each other through groove 137; and ports 110 and 95 will be in communication with each other through groove 111. Groove 166 will be out of register with port 95 and passage 167 and therefore pressure from chamber 2 will be confined to passages 48 and 167. When charging the system with the governing valve adjusted for quick-release operations, the flow of air from port 93 to port 95 and chamber 3 is the same as when the governing valve is adjusted for graduated-release operations; and the flow of air from port 95 to chamber 4 is likewise the same. As this flow of air is fully set forth in the description of the graduated-release operations it is unnecessary to describe it at this point. In quick-release operations, with the pilot valve K′, the graduating valve and the main slide valve in their service lap positions, communication between chamber 4 and port 95 is cut off; and the air from chamber 2 cannot flow to port 95 as groove 166 of the governing valve is out of register with passage 167 and port 95. The emergency reservoir air is at this time admitted to chamber 3 to hold the slide valves to their seats, the flow of said air being through 146, 145, 153, past check valve 114, through passage 112, port 110, groove 111, port 95, passage 94 and port 93, this latter port being uncovered at this time by the main slide valve I. (See Fig. 7ª.)

A quick release of the brakes is obtained by slightly raising brake pipe pressure in chamber 47. The combined pressures in chambers 47 and 51 will then oppose and overcome the emergency reservoir pressure in chamber 54 and the diaphragms 46, 49 and 50 will be lowered, resulting in a movement of the pilot valve K' to release position as shown in Fig. 3. A passage 102 in the pilot slide valve K' will establish communication between ports 101 and 103 of the slide valve seat. The emergency reservoir pressure, which up to this time has been maintained undisturbed, will be released to chamber 4 through passage 146, groove 145, passage 153, past check valve 114, into chamber 113 and thence through passage 112 to port 110 of the release-governing valve seat. From port 110 the air will flow through groove 111 to port 95 and thence through groove 96, passages 97, 98 and 100 to port 101 of the pilot valve seat, and thence through groove 102, port 103 passages 104, 105, 106 and port 107 of the main slide valve seat, groove 108 of the main slide valve and port 109, into chamber 4. The admission of the high emergency reservoir pressure to chamber 4 above the reduced brake pipe pressure in chamber 2 will cause a positive movement of the actuating piston and the slide valve from service lap position, shown in Figs. 8, 8ª and 8ᵇ, to full-release position, shown in Figs. 2, 5, 5ª and 5ᵇ.

The groove 92 in the main slide valve will open port 14 to port 93 and the emergency reservoir air will then flow to the brake pipe past the check valve 114, through passage 112 to port 110 of the release-governing valve seat, thence through groove 111 to port 95 and through passage 94 to port 93, and thence to brake pipe port 14. The emergency reservoir air will thus quickly equalize into the brake pipe, rapidly raising the brake pipe pressure and resulting in a quick release of the brakes. As each triple valve is moved to quick-release position the wave of increased brake pipe pressure will flow rapidly through the brake pipe throughout the length of the train. Brake cylinder pressure is released to atmosphere from brake cylinder port 127 of the main slide valve seat, through groove 131 of the main slide valve to release port 132, this latter port being in communication with release port 136 of the governing valve through passages 133 and 134. Release port 136 is in communication with the exhaust port 138 through the release groove 137 of the release-governing valve. From exhaust port 138 the air will pass directly to atmosphere or to the usual retaining valve. Brake cylinder pressure will also be released to atmosphere through the pilot valve K'. This release of part of the brake cylinder air, although part of the operation, is not essential when the triple valve is adjusted for quick-release operations.

After a quick release of the brakes as just described, the pressures may be restored in the system in the usual way through an increase in brake pipe pressure.

*Graduated release.*

To adjust the triple valve for graduated-release operations the release-governing valve M is manually operated to graduated-release position, thereby closing ports 136 and 138 and disconnecting ports 110 and 95. The release-governing valve is provided with an elbow groove 166 which connects port 95 with a port 167 when the valve is in graduated-release position, so that ports 136, 138 and 110 are completely closed in the graduated-release position of the governing valve, and port 95 is in communication with port 167 through the elbow groove 166. The port 167 leads directly to chamber 2 through passage 48 (Fig. 4ª).

With the release-governing valve in graduated-release position as indicated, and assuming the brakes to be applied, an increase in brake pipe pressure will, of course, result in an increase of pressure in chamber 47, thereby lowering the diaphragms 46, 49 and 50 and moving the pilot valve K' to release position, as shown in Fig. 3. Thus far the operation is precisely as described in connection with a quick-release operation. The flow of air to chambers 2, 3 and 4, under these operating conditions, is as follows: The increase of brake pipe pressure will flow to port 95 from two different sources, one being from the brake pipe connection H' through passages 11, 12 and 13 to port 14 and thence to port 95 through slide valve groove 92, port 93 and passage 94, the other supply being from port 12 through passage 15, port 16, to chamber 2 through the emergency slide valve port 41 and from chamber 2 to port 95 through passages 48 and 167 and through groove 166 in the release governing valve. Chamber 3 is charged through a groove 115 located in the slide valve seat (Fig. 12) and which extends laterally into chamber 3 from port 93 previously referred to.

Referring to Figs. 3, 4 and 5, the pressure will flow from port 95 to the seat of the pilot valve K' through groove 96 and passages 98 and 100 and port 101, then through port 102 in the pilot valve, port 103 in its seat, passages 104, 105 and 106 to port 107 in the main slide valve seat and into chamber 4 through groove 108 and port 109.

In service position the brake pipe pressure will be admitted to chamber 3 from chamber 2 for the purpose of holding the slide valve I to its seat through passage 48, passage 167, groove 166, port 95, passage 94 and port 93.

It is manifest that under these operating conditions (graduated-release) the emergency reservoir pressure is not admitted to chamber 3 as the groove 111 is out of register with ports 95 and 110 as before stated.

If the main slide valve should remain in service position by reason of the brake pipe reservoir pressure being built up at the same rate as the brake pipe pressure through groove 161 (see Fig. 7$^b$), there will be no flow of air through the pilot valve port 102 other than that required to build up the pressure in chamber 4 at the same rate as the increase of brake pipe pressure. Chamber 2 is at this time in direct communication with chamber 4 through pilot valve port 102 and the various ports and passages connecting these two chambers through said port as previously set forth.

It should be understood that when operating in graduated-release, chambers 2 and 3 are always in direct communication and that these two chambers are in communication with chamber 4 in release position of the pilot valve only.

When the pilot valve, the graduating valve and the main slide valve are in service lap position, ports 101 and 103 of the pilot valve are not connected (see Fig. 19), and, therefore, chamber 4 is out of register with port 95 and chambers 2 and 3, but the last-named chambers are in direct communication with each other through passage 48, passage 167, groove 166, port 95, passage 94 and port 93.

The object of admitting the brake pipe pressure in chamber 2 to chamber 3 is to prevent the main slide valve from being lifted from its seat by the pressure in chamber 4. The pilot valve K' is formed with a release groove 149 which, in the release position of the valve, connects port 168 to the release port 150, this latter port being in communication with the brake cylinder through passages 151, 152, 129 and 130, (Fig. 4). Exhaust port 168 is open to atmosphere through lateral passage 169 in the valve seat of the pilot valve. The release of brake cylinder pressure to atmosphere through passage 169 will continue until the brake cylinder pressure in the equalizing chamber 51 has been reduced in proportion to the increase of brake pipe pressure in chamber 47. When this occurs the emergency reservoir pressure in chamber 54 will raise the diaphragms and the pilot valve until the port 168 is lapped by the pilot valve, thereby stopping further release of brake cylinder pressure to atmosphere. A further increase in brake pipe pressure will result in a further proportional decrease in brake cylinder pressure so that a graduated release of the brakes may be obtained by the step-by-step increasing of brake pipe pressure.

If the brake pipe pressure should be raised very slowly air will enter the brake pipe reservoir and the quick-action chamber 10 through port 14, groove 92, extension 162 of groove 92, grooves 161, 160 and port 118. The pressures on both sides of the emergency piston 9 will be then raised equally and said piston will not be operated to move the slide valve I to full-release position.

To provide means for slowly charging an emergency reservoir that may have leaked slightly during a long braking period, and when operating in graduated release, the supplemental charging port 143$^a$ is provided in the main slide valve seat, said port being in communication with port 143 and with passage 144. When the main slide valve is in service position (Fig. 7$^a$), and in service lap position (Fig. 8$^a$), port and passage 142 is in register with supplemental charging port 143$^a$. In service lap position (Fig. 8$^a$) the extension 141 of groove 140 of the graduating valve is in communication with chamber 4 through the operating slot 25 in the main slide valve, so that the reduced emergency reservoir will be fully recharged from chamber 4 through the extension 141, groove 140, port 142, supplemental charging port 143$^a$ and passage 144. In service lap position as shown in Fig. 8$^a$ the groove 140 of the graduating valve will be slightly open to port 142 to permit the restoring of the emergency reservoir pressure as described. Emergency reservoir air is undisturbed during graduated release and graduated applications.

When the pressure in the brake pipe is increased faster than it can flow to the brake pipe reservoir, thus building up a pressure in brake pipe chamber 2 and causing the pistons and slide valve I to move to full-release position, the groove 140 will be moved out of register with port 142, thus preventing an overcharge of the connected emergency reservoir during the period of high pressure in the brake pipe.

When the triple valve is adjusted for graduated-release operations, the brake cylinder pressure is not released to atmosphere direct, but through the release groove and ports of the pilot valve; and emergency reservoir air cannot pass to the brake pipe, because the ports in the release-governing valve are closed. Also the brake pipe reservoir is recharged through the main slide valve chamber 3 and ports 116, 117 and 118, as before described in connection with the charging operation.

Emergency position.

(See Figs. 2ª, 9, 9ª and 9ᵇ.)

An emergency operation of the triple valve is obtained by a sudden and prolonged reduction in brake pipe pressure. This results in a reduction of pressure in brake pipe chamber 2 considerably below the pressure in the quick-action chamber 10, with the result that the emergency piston 9 will be moved toward the left, causing the stop 30 to engage the cross head 28. A continued movement of the emergency piston moves the actuating piston and also brings the emergency valve stem 37 into engagement with the bottom of the bore 32 of the emergency piston stem. A further movement of the emergency piston moves the main slide valve and the emergency slide valve to emergency position, as shown in Figs. 9, 9ª, 9ᵇ and 2ª. The emergency slide valve J will place the brake pipe exhaust port 39 in communication, through emergency release groove 40, with the brake pipe supply port 16, so that the brake pipe will be vented directly to atmosphere through the port 39 and brake pipe air will be exhausted through connection H', passages 11, 12 and 15 and the ports just described.

The spring chamber 82 of the automatic emergency pilot valve will be cut off from the vent port 170, as shown in Fig. 9, and will be connected through release groove 131 of the main slide valve to groove 171 on the edge of the main slide valve seat, which groove is in communication with the main slide valve chamber 3 so that pressure from said chamber 3 will be admitted to spring chamber 82. An equalization of pressures will thereupon occur on each side of the piston 80 and the spring 81 will move the piston 80 and the slide valve L to the position shown in Fig. 3. In the full-release position of the valves, and when the apparatus is fully charged and in what may be termed the running position, the emergency pilot valve plunger 80 and slide valve L are in the position shown in Fig. 3. Upon a service application of the brakes chamber 82 will be vented to atmosphere as herein described, and the pressure in chamber 79ª will lift the plunger against the tension of the spring 81 and thereby move slide valve L to close port 86. When, therefore, the emergency application follows a service application, the operation just described, and wherein the pressures on opposite sides of the plunger 80 are equalized to permit the spring 81 to move the plunger and the slide valve L downwardly to open communication between ports 77 and 84 through port 86, takes place.

The main slide valve is formed with a groove 164, which, in the emergency position of the valve, connects port 165 with port 139 and permits emergency reservoir air to flow from 165 into said port 139 and thence directly to chamber 87 of the automatic emergency pilot valve, through passage 78 and from said chamber to the quick-action chamber 10 through port 86 and passage 89. Groove 164 also connects port 165 with a small lateral groove 172 in the face of the valve seat, said groove communicating with the interior of the valve chamber 3 to permit emergency reservoir pressure to flow directly into said valve chamber and thence to the brake cylinder through the brake cylinder port 127, this latter port being uncovered in the emergency position of the valve as shown in Fig. 9. It is manifest that this flow of air from groove 172 to the brake cylinder through chamber 3 and port 127 is independent of the flow of air through the automatic emergency pilot valve passages 89 and 90, ports 91, 41 and 173. A passage 90 leads from the passage 89 to the chamber 2 through port 91 in the emergency slide valve seat to admit emergency reservoir pressure to emergency slide valve chamber 5 and chamber 2, and thence to the brake cylinder through port 41 of the emergency slide valve which is in communication with the emergency brake cylinder port 173, groove 174 of bushing 17 (see Fig. 1), groove 175, passage 128, groove 129 and passage 130, as shown in Figs. 1 and 4. The brake pipe reservoir pressure will be admitted past check valve 122 into quick-action chamber 10 and thence through passages 89, 90 and 91 to the brake cylinder with the emergency reservoir pressure when pressure in said reservoir is above equalization of brake pipe reservoir and brake cylinder.

Emergency reservoir air alone will flow to brake cylinder, when an emergency application occurs with pressure in the brake pipe reservoir below the point of equalization of brake pipe reservoir and the brake cylinder.

The emergency slide valve J will remain in emergency position until the pressures in chamber 2 and the brake cylinder have equalized with the pressure in the quick-action chamber 10, at which time the emergency slide valve will be moved by the emergency spring 38ª until the head 31 engages the cross head 28. The port 176 of the emergency slide valve will then register with the emergency brake cylinder port 173, and the ports 41 and 40 will be blanked and 91 will remain open. This is the second position of the emergency slide valve. (See Fig. 2ᵇ.)

The inner end of groove 92 of the main slide valve is open to the chamber 4 through the operating slot in the seat of said valve, as shown in Fig. 9ª, and the pressure in chamber 4 will be vented to the brake pipe through the port 14, said port being provided with a slight lateral extension 14ª to maintain this communication in the emergency position of the valve. The main actuating piston 7, in the emergency position of the valve, bears against the gasket 177 to prevent the brake cylinder pressure from entering chamber 4 around piston 7.

The U-shaped groove 125 of the main slide valve, in the emergency position of the valve, is disconnected from the ports 124 and 126, and groove 178 of the slide valve will connect port 143 to port 124 and emergency reservoir pressure will flow to the atmospheric chamber 53ª of the controller device. As the emergency reservoir pressure has at this time equalized with the brake cylinder the pressures on the diaphragms 46, 49 and 50 will be equal and the pilot valve will not move to release position.

To release the brakes after an emergency application the brake pipe pressure is raised, thereby increasing the pressure in chamber 4 (see Fig. 9ª), through the extension 14ª of port 14, groove 92, which is in direct communication with chamber 4. At this time chamber 2 is cut off from the brake pipe. When the pressure in chamber 4 has been raised above the brake cylinder pressure in chamber 2 the actuating piston will be moved to the right and all of the parts of the triple valve will be moved to release and charging position, and the emergency valve J will complete its travel to the position shown in Fig. 2 and chamber 2 will again be placed in communication with the brake pipe through port 41. When port 41 is in register with port 16, increasing brake pipe pressure will flow to chamber 2 and thence through passage 48 to actuating chamber 47 to move the pilot valve to charging and release position.

*Automatic emergency.*

The automatic emergency pilot valve G operates to throw the triple valve into emergency position when the brake pipe pressure has been reduced to a point where it would furnish inadequate braking power for the proper control of the train. In an air brake apparatus of the type herein described, wherein air for service applications of the brakes is taken from the brake pipe and from a brake pipe augmenting reservoir, it is desirable to provide means for operating the triple valve to emergency position for an emergency application of the brakes where the braking power is depleted to a dangerous point by an undesired reduction in brake pipe pressure through leaks or otherwise.

As hereinbefore stated, upon a service application of the brakes chamber 82 will be vented to atmosphere through ports 99 and 170 as shown in Fig. 7. The pressure in chamber 79ª will lift the plunger 80 and close port 86 in the slide valve L. In the normal or running position of the apparatus the plunger 80 and the slide valve L are in the position shown in Fig. 3, so that it is only after a service application that the valve G operates as an emergency pilot valve. The brake pipe reservoir is in direct communication with the chamber 79ª of the emergency pilot valve through passage 89 to quick-action chamber 10, and said chamber 10 is in direct communication with the brake pipe reservoir through passages 123 and 119. When, therefore, following a service application of the brakes and before the brakes are released and the apparatus again recharged and in running position, the brake pipe pressure is reduced below the danger point, for instance below twenty pounds, the brake pipe reservoir pressure in chamber 79ª will likewise be reduced to twenty pounds or below, and the spring 81, which opposes the pressure in chamber 79ª, will move the piston 80 and the slide valve L connected thereto, to the position shown in Fig. 3, thereby opening port 86 and permitting emergency reservoir pressure to flow from chamber 87 through chamber 79ª, port 84 and passage 89 to the quick-action chamber 10. This flow of high-pressure air into the quick-action chamber will force the emergency piston and the connected valves to emergency position. The triple valve may be operated in either graduated or quick-release positions without changing the operation of the automatic emergency pilot valve.

The restriction port 122ª through the check valve 122 prevents an immediate equalization of the emergency reservoir and brake pipe reservoir pressures, thereby permitting the emergency reservoir and brake cylinder pressures to momentarily equalize at a high pressure. The brake cylinder pressure and the emergency reservoir pressure will gradually equalize into the brake pipe reservoir, thereby slowly decreasing the brake cylinder pressure, all of these pressures eventually equalizing.

The lateral groove 171 in the main slide valve seat, as hereinbefore described, is connected to chamber 82 of the emergency pilot valve, thereby admitting brake cylinder pressure, which is in chamber 3, to chamber 82 to maintain the valve L in its open position. When the valves are moved to full-release position following a service application, the plunger 80 and the slide valve L will remain in their upper positions and the port 86 will remain closed until there has been a leakage of air around the plunger 80 sufficient to equalize the pressures on opposite sides of the piston. This leakage, of course, may be very slow and it may require considerable time before the plunger 80 is moved downwardly by the spring 81. As the port 99 is closed by the main slide valve I in the release position, as shown in Fig. 5, it is manifest that eventually there will be an equalization of pressures on opposite sides of the plunger 80, and upon this equalization of pressures the spring 81 will move the plunger and the slide valve L downwardly.

The automatic emergency pilot valve may be dispensed with if desired, by detaching it from the triple valve and substituting therefor a closure plate adapted to blank ports 83, 78 and 89, and to maintain communication between grooves and passages 145, 146, 148, 144 and 153. When the automatic emergency pilot valve is removed, all of the operations of the triple valve remain the same except that the triple valve will not be automatically moved to emergency position upon a depletion of the brake pipe pressure. Port 91 and passage 90 are only necessary in emergency when emergency pilot valve is not used, and they serve to permit equalization of pressures in brake pipe reservoir, quick action chamber 10 and chambers 2 and 5 and the brake cylinder. With the emergency pilot valve in use, this equalization would also take place through the emergency pilot valve and the brake cylinder ports.

When the main slide valve and the emergency slide valve are moved to emergency position the brake pipe is vented to atmosphere, with the result that all of the triple valves in the train will go to emergency position. The result, therefore, of one emergency pilot valve operating to move its triple valve to emergency position will be to secure or bring about the emergency operation of all of the brakes in the train precisely as if the emergency application were secured through the manipulation of the engineer's brake valve.

What I claim is:—

1. An air brake apparatus comprising a triple valve, a brake cylinder, a brake pipe connected to the triple valve, a main slide valve in said triple valve, a main actuating piston connected to said slide valve, means to admit brake pipe pressure on opposite sides of the main actuating piston, and means operating upon a reduction of brake pipe pressure to exhaust brake pipe air from one side of said actuating piston to permit brake pipe air on the opposite side of said piston to move it and the main slide valve into position to admit air to the brake cylinder.

2. A triple valve for an air brake apparatus comprising a slide valve, an actuating piston connected thereto, means for admitting air on opposite sides of said actuating piston, and means operating upon a reduction of pressure on one side of said piston to exhaust the air from the other side of said actuating piston thereby to permit the reduced pressure on the opposite side of said piston to move said piston and the slide valve connected thereto into position to admit air to a brake cylinder.

3. A triple valve for an air brake apparatus comprising a slide valve, an actuating piston connected thereto, means for admitting air on opposite sides of said actuating piston, means operating upon a reduction of brake pipe pressure to exhaust the air from one side of said actuating piston to permit the air on the opposite side of said piston to move said piston and the slide valve connected thereto into position to admit air to a brake cylinder, and means operating when the slide valve is in application position to admit air to the exhausted side of the actuating piston to stop said piston and slide valve in application position.

4. A triple valve for an air brake apparatus comprising a slide valve, an actuating piston connected thereto, means for admitting air on opposite sides of said actuating piston, means operating upon a reduction of brake pipe pressure to exhaust the air from one side of said actuating piston to permit the air on the opposite side of said piston to move said piston and the slide valve connected thereto into position to admit air to a brake cylinder, means operating when the slide valve is in application position to admit air to the exhausted side of the actuating piston to stop said piston and slide valve in application position, and means controlled by brake cylinder pressure to cause the slide valve to move to lap position.

5. A triple valve for an air brake apparatus comprising a slide valve, an actuating piston connected thereto, means for admitting air on opposite sides of said actuating piston, means operating upon a reduction of brake pipe pressure to exhaust the air from one side of said actuating piston to permit the air on the opposite side of said piston to move said piston and the slide valve connected thereto into position to admit air to a brake cylinder, and means controlled by brake cylinder pressure to cause the slide valve to move to lap position.

6. An air brake apparatus comprising a triple valve, a brake cylinder, a brake pipe connected to the triple valve, a main slide valve in said triple valve, a main actuating piston connected to said slide valve, means to admit brake pipe pressure on opposite sides of the main actuating piston, means operating upon a reduction of brake pipe pressure to exhaust brake pipe air from one side of said actuating piston to permit brake pipe air on the opposite side of said piston to move it and the main slide valve into position to admit air to the brake cylinder, and means controlled by brake cylinder pressure to cause the slide valve to move to lap position.

7. A triple valve for air brake apparatus comprising a slide valve, an actuating piston therefor, means operating upon a reduction of brake pipe pressure to cause the piston and slide valve to move inwardly to application position, and means operating upon an increase of brake pipe pressure to cause the actuating piston and the slide valve to move outwardly to release position.

8. A triple valve for an air brake apparatus comprising a slide valve, an actuating piston connected thereto, an emergency valve, means operating upon a sudden reduction of brake pipe pressure to move both the slide valve and the emergency valve inwardly to application position for an emergency application of the brakes, and means operating upon an increase of brake pipe pressure to move said valves outwardly to release position.

9. A triple valve for an air brake apparatus comprising a slide valve, an actuating piston connected thereto, means for admitting air on opposite sides of said actuating piston, means operating upon a reduction of brake pipe pressure to exhaust the air from one side of said actuating piston to permit the air on the opposite side of said piston to move said piston and the slide valve connected thereto into position to admit air to a brake cylinder, and means operating to admit air to the exhausted side of the actuating piston to stop said piston and slide valve in application position.

10. A triple valve for an air brake apparatus comprising a valve to admit air to the brake cylinder, an actuating means therefor, means for admitting air on opposite sides of said actuating means to hold the valve in position to close the ports leading to the brake cylinder, and means operating upon a reduction of brake pipe pressure to reduce the air pressure at both sides of said actuating means to permit the higher of the two reduced pressures to actuate said means to move the valve into position to admit air to a brake cylinder.

11. A triple valve for an air brake apparatus comprising a valve to admit air to the brake cylinder, an actuating means therefor, means for admitting air on opposite sides of said actuating means to hold the valve in position to close the ports leading to the brake cylinder, and means operating upon a reduction of brake pipe pressure to exhaust the air from one side of said actuating means to the brake cylinder, and thereby permit the air on the opposite side of said means to move the valve into position to admit air to a brake cylinder.

12. A triple valve for an air brake apparatus comprising a valve to admit air to the brake cylinder, an actuating means therefor, means for admitting air on opposite sides of said actuating means to hold the valve in position to close the ports leading to the brake cylinder, means operating upon a reduction of brake pipe pressure to exhaust the air from one side of said actuating means to permit the air on the opposite side of said means to move the valve into position to admit air to a brake cylinder, and means operating to admit air to the exhausted side of the actuating means to stop the valve in application position.

13. A triple valve for an air brake apparatus comprising a valve to admit air to the brake cylinder, an actuating means therefor, means for admitting air on opposite sides of said actuating means to hold the valve in position to close the ports leading to the brake cylinder, means operating upon a reduction of brake pipe pressure to exhaust the air from one side of said actuating means to the brake cylinder and thereby permit the air on the opposite side of said means to move the valve into position to admit air to a brake cylinder, and means operating to admit air to the exhausted side of the actuating means to stop the valve in application position.

14. A triple valve for an air brake apparatus comprising a valve to admit air to the brake cylinder, an actuating means therefor, means to admit brake pipe pressure on opposite sides of the said actuating means, and means operating upon a reduction of brake pipe pressure to exhaust brake pipe air from one side of said actuating means to permit the brake pipe air on the opposite side of said actuating means to move the valve into position to admit air to the brake cylinder.

15. A triple valve for an air brake apparatus comprising a valve to admit air to the brake cylinder, an actuating means therefor, means to admit brake pipe pressure on opposite sides of the said actuating means, means operating upon a reduction of brake pipe pressure to exhaust brake pipe air from one side of said actuating means to permit the brake pipe air on the opposite side of said actuating means to move the valve into position to admit air to the brake cylinder, and means operating to admit air to the exhausted side of the actuating means to stop the valve in application position.

16. A triple valve for an air brake apparatus comprising a valve to admit air to the brake cylinder, an actuating means therefor, means to admit brake pipe pressure on opposite sides of the said actuating means, means operating upon a reduction of brake pipe pressure to exhaust brake pipe air from one side of said actuating means to permit the brake pipe air on the opposite side of said actuating means to move the valve into position to admit air to the brake cylinder, and means operating to admit brake pipe air to the exhausted side of the actuating means to stop the valve in application position.

17. An air brake apparatus comprising a triple valve, a brake cylinder, a brake pipe connected to the triple valve, a main slide valve in said triple valve, a main actuating piston connected to said slide valve, means to admit brake pipe pressure on opposite sides of the main actuating piston, means operating upon a reduction of brake pipe pressure to exhaust brake pipe air from one side of said actuating piston to permit brake pipe air on the opposite side of said piston to move it and the main slide valve into position to admit air to the brake cylinder, and means operating to admit air to the exhausted side of the actuating piston to stop said piston and slide valve in application position.

18. An air brake apparatus comprising a triple valve, a brake cylinder, a brake pipe connected to the triple valve, a main slide valve in said triple valve, a main actuating piston connected to said slide valve, means to admit brake pipe pressure on opposite sides of the main actuating piston, means operating upon a reduction of brake pipe pressure to exhaust brake pipe air from one side of said actuating piston to permit brake pipe air on the opposite side of said piston to move it and the main slide valve into position to admit air to the brake cylinder, and means operating when the slide valve is in application position to admit brake pipe air to the exhausted side of the actuating piston to stop said piston and slide valve in application position.

19. An air brake apparatus comprising a triple valve, a brake cylinder, a brake pipe connected to the triple valve, a main slide valve in said triple valve, a main actuating piston connected to said slide valve, means to admit brake pipe pressure on opposite sides of the main actuating piston, means operating upon a reduction of brake pipe pressure to exhaust brake pipe air from one side of said actuating piston to permit brake pipe air on the opposite side of said piston to move it and the main slide valve into position to admit air to the brake cylinder, means operating when the slide valve is in application position to admit brake pipe air to the exhausted side of the actuating piston to stop said piston and slide valve in application position, and means controlled by brake cylinder pressure to cause the slide valve to move to lap position.

20. A triple valve for an air brake apparatus comprising a valve to admit brake pipe air to the brake cylinder for a service application of the brakes, an actuating means therefor, means for admitting brake pipe air on opposite sides of said actuating means to hold the valve in position to close the ports leading to the brake cylinder, and means operating upon a reduction of brake pipe pressure to exhaust the air from one side of said actuating means to permit the brake pipe air on the opposite side of said actuating means to move the valve into position to admit brake pipe air to a brake cylinder.

21. A triple valve for air brake apparatus comprising a slide valve, an actuating piston therefor, means operating upon a reduction of brake pipe pressure to cause the piston and slide valve to move inwardly to application position, said means being controlled by brake cylinder pressure, brake pipe pressure and the pressure of an emergency reservoir to cause the slide valve to move to lap position when the desired pressure has been built up in the brake cylinder.

22. A triple valve for air brake apparatus comprising a slide valve, an actuating piston therefor, means for admitting brake pipe air on opposite sides of said actuating piston, means operating upon a reduction of brake pipe pressure to exhaust the air from one side of said actuating piston and thereby permit the air on the opposite side of said piston to move said piston and the slide valve into application position to admit brake pipe air to the brake cylinder for a service application of the brakes, and to admit brake pipe air to the exhausted side of the actuating piston to stop said piston and the slide valve in application position, and means controlled by brake cylinder pressure to move the slide valve to lap position when the desired pressure has been built up in the brake cylinder.

23. An air brake apparatus comprising a brake pipe, a brake cylinder, a brake pipe reservoir, a slide valve, an actuating piston therefor, means to admit brake pipe air on opposite sides of said piston, means operating upon a slow reduction of brake pipe pressure to exhaust brake pipe air from one side of the actuating piston into the brake cylinder to permit the brake pipe air on the opposite side of said piston to move the slide valve into position to connect the brake pipe and the brake pipe reservoir to the brake cylinder for a service application of the brakes, and also to connect the brake pipe to the exhausted side of the actuating piston to stop the valve in application position, and means controlled by brake cylinder pressure to stop the flow of air from one side of the actuating piston to the brake cylinder and thereby cause the slide valve to move to lap position.

24. An air brake apparatus comprising a brake pipe, a brake cylinder, an emergency reservoir, a brake pipe reservoir, a slide valve, an actuating piston therefor, means to admit brake pipe air on opposite sides of said piston, means operating upon a slow reduction of brake pipe pressure to exhaust brake pipe air from one side of the actuating piston into the brake cylinder to permit the brake pipe air on the opposite side of said piston to move the slide valve into position to connect the brake pipe and the brake pipe reservoir to the brake cylinder for a service application of the brakes and also to connect the brake pipe to the exhausted side of the actuating piston to stop the valve in application position, means controlled by brake cylinder pressure to stop the flow of air from one side of the actuating piston to the brake cylinder and thereby cause the slide valve to move to lap position, and means operating upon a sudden reduction of brake pipe pressure to connect the brake pipe to atmosphere and to connect the emergency reservoir and the brake pipe reservoir to the brake cylinder.

25. An air brake apparatus comprising a brake pipe, a brake cylinder, an emergency reservoir, a brake pipe reservoir, a triple valve embodying a slide valve and an actuating piston, means to admit brake pipe air on opposite sides of said actuating piston, and a pilot valve controlled by brake pipe, brake cylinder, and emergency reservoir pressures, and operating upon a reduction of brake pipe pressure to exhaust brake pipe air from one side of the actuating piston into the brake cylinder to permit the brake pipe air on the opposite side of said piston to move it and the slide valve to application position to admit brake pipe air to the brake cylinder, the pilot valve operating to cause the slide valve to move to lap position when the desired pressure has been built up in the brake cylinder.

26. An air brake apparatus comprising a brake pipe, a brake pipe reservoir, a slide valve, an actuating piston therefor, means to admit brake pipe air on opposite sides of said piston, means operating upon a slow reduction of brake pipe pressure to exhaust brake pipe air from one side of the actuating piston into the brake cylinder to permit the brake pipe air on the opposite side of said piston to move the slide valve into position to connect the brake pipe and the brake pipe reservoir to the brake cylinder for a service application of the brakes and also to connect the brake pipe to the exhausted side of the actuating piston to stop the valve in application position.

27. An air brake apparatus comprising a brake pipe, a triple valve embodying a slide valve and an actuating piston therefor, a brake cylinder, a brake pipe reservoir, an emergency reservoir, means to admit brake pipe air on opposite sides of the actuating piston, means operating upon a slow reduction of brake pipe pressure to exhaust air from one side of the actuating piston to permit said piston and its slide valve to move to application position to admit brake pipe and brake pipe reservoir air to the brake cylinder for a service application of the brakes and to admit brake pipe air to the slide valve chamber to hold said valve to its seat, and means controlled by brake cylinder pressure to cause the slide valve to move to lap position when the desired pressure is in the brake cylinder.

28. A triple valve comprising means operating upon a slow reduction of brake pipe pressure to admit air to the brake cylinder for a service application of the brakes, and an automatically operating emergency pilot valve operating when the brake pipe pressure is reduced to or below a certain pressure to automatically admit high pressure air to the triple valve to move the said valve into emergency position for an emergency application of the brakes.

29. A triple valve comprising means operating upon a slow reduction of brake pipe pressure to admit brake pipe air to the brake cylinder for a service application of the brakes, and an automatically operating emergency pilot valve operating when brake pipe pressure is reduced to or below a certain pressure to automatically admit high pressure air to the triple valve to move the said valve into emergency position to admit high pressure air from a separate source of supply into the brake cylinder for an emergency application of the brakes.

30. An air brake apparatus comprising a brake pipe, a triple valve, an emergency reservoir, a brake pipe reservoir, a brake cylinder, means in the triple valve operating upon a slow reduction of brake pipe pressure to admit brake pipe and brake pipe reservoir air to the brake cylinder for a service application of the brakes, means in the triple valve operating upon a sudden reduction in brake pipe pressure to admit emergency reservoir and brake pipe reservoir air to the brake cylinder for an emergency application of the brakes, and means operating when the brake pipe pressure has been reduced to or below a certain pressure to automatically admit emergency reservoir air to the triple valve to move said valve into emergency position to admit emergency reservoir air through said triple valve to the brake cylinder for an automatic emergency application of the brakes.

31. An air brake apparatus constructed in accordance with claim 1, and provided with means operating upon an increase of brake pipe pressure to admit air to the exhausted side of the actuating piston to move the slide valve to full-release position, said means also controlling the release of brake cylinder pressure through the slide valve.

32. In an air brake apparatus, the combination of a brake pipe, an emergency reservoir, a brake cylinder, a triple valve comprising a slide valve and an actuating piston therefor, means operating upon a reduction of brake pipe pressure to cause the piston and slide valve to move inwardly to application position, and means operating upon an increase of brake pipe pressure to admit emergency reservoir air to the inner side of the actuating piston to move the piston and the slide valve outwardly to full-release position, said means also controlling the release of brake cylinder air through the triple valve.

33. In an air brake apparatus, the combination of a brake pipe, an emergency reservoir, a brake cylinder, a triple valve comprising a slide valve and an actuating piston therefor, means operating upon a reduction of brake pipe pressure to cause the piston and slide valve to move inwardly to application position, and manually adjustable means operating upon an increase of brake pipe pressure to admit emergency reservoir air to the inner side of the actuating piston to move the piston and the slide valve outwardly to full-release position, said means also controlling the release of brake cylinder air through the triple valve.

34. In an air brake apparatus, the combination of a brake pipe, an emergency reservoir, a brake cylinder, a triple valve comprising a slide valve and an actuating piston therefor, means operating upon a reduction of brake pipe pressure to cause the piston and slide valve to move inwardly to application position, and a release-governing valve adapted to be manually adjusted to one position to secure a quick, full release of the brakes and to another position to secure a graduated release of the brakes, or a slow, full release of the brakes.

35. A triple valve comprising a slide valve and an actuating piston adapted to be moved in one direction by brake pipe pressure for an application of the brakes, and means operating upon an increase of brake pipe pressure to cause said actuating piston to be moved against rising brake pipe pressure to move the slide valve to release position.

36. A triple valve for an air brake apparatus comprising a casing having main and supplemental brake pipe pressure chambers, a slide valve, an actuating piston connected to the slide valve and subject to the opposing pressures of said chambers, and means operating upon a reduction of brake pipe pressure in the main chamber to exhaust the air from the supplemental chamber to permit the reduced brake pipe pressure in the main chamber to move said piston and the slide valve connected thereto into position to admit air to a brake cylinder.

37. A triple valve for an air brake apparatus comprising a slide valve and an actuating piston therefor adapted to be moved inwardly to application position by reduced brake pipe pressure, and operating upon an increase of brake pipe pressure to be moved outwardly against the increasing brake pipe pressure to release position.

38. A triple valve for an air brake apparatus comprising a main service slide valve, an actuating piston connected to the main slide valve and having a slight independent movement, a graduating valve connected positively to the actuating piston to move therewith, a main brake pipe chamber formed on one side of the actuating piston and a supplemental brake pipe chamber formed on the opposite side of said piston, a pilot valve, means operated by variations in brake pipe pressure for operating said pilot valve, said pilot valve being formed with ports which, in the release and charging position of said valve, connect the brake pipe with a port in the main slide valve, the main service slide valve being formed with ports which, in the release position of said valve connect the brake pipe with the slide valve chamber and other ports which permit the brake pipe air to flow from the pilot valve to the said supplemental brake pipe chamber and with other ports which permit air to flow from the slide valve chamber to a brake pipe reservoir and to a quick-action chamber, and means operating upon an equalization of pressures in the quick-action chamber and in the main brake pipe chamber to move the graduating valve to connect the supplemental brake pipe chamber to an emergency reservoir, whereby when the brake pipe and brake pipe reservoir and quick-action chamber pressures have equalized the emergency reservoir will be charged.

39. A triple valve for an air brake apparatus comprising a main service slide valve, an actuating piston therefor connected to the main slide valve and having a slight independent movement, a graduating valve connected directly to the actuating piston to move therewith, a main brake pipe chamber formed on one side of the actuating piston and a supplemental brake pipe chamber formed on the opposite side of said piston, a pilot valve, means operated by variations in brake pipe pressure for operating said pilot valve, said pilot valve being formed with ports which, in the release and charging position of said valve, connect the brake pipe with the supplemental brake pipe chamber, the main service slide valve being formed with ports which, in the release position of said valve connect the brake pipe with the slide valve chamber and other ports which permit the brake pipe air to flow from the pilot valve to the said supplemental brake pipe chamber and with other ports which permit air to flow from the slide valve chamber to a brake pipe reservoir and to a quick-action chamber, means operating upon an equalization of pressures in the quick-action chamber and in the main brake pipe chamber to move the graduating valve to connect the supplemental brake pipe chamber to an emergency reservoir, whereby when the brake pipe and brake pipe reservoir pressures have equalized the emergency reservoir will be charged, and means whereby the pilot valve will be moved to lap position when the pressure in the emergency reservoir equalizes with the pressure in the brake pipe.

40. A triple valve for an air brake apparatus comprising a main service slide valve, an actuating piston connected to the main slide valve and having a slight independent movement, a graduating valve connected positively to the actuating piston and moving therewith, a main brake pipe chamber formed on one side of the actuating piston and a supplemental brake pipe chamber formed on the opposite side of said piston, an emergency piston in the main brake pipe chamber and having a quick-action chamber formed at one side thereof and connected to a brake pipe reservoir, means connecting the actuating piston with the emergency piston whereby the pressure in the main brake pipe chamber will hold the graduating valve in position to close the emergency reservoir charging ports until there is an equalization of pressures in the main brake pipe chamber and in the quick-action chamber, and means to move the graduating valve when said equalization takes place to open the emergency reservoir charging ports.

41. A triple valve for an air brake apparatus comprising a main service slide valve, an actuating piston connected thereto to have a slight independent movement, a graduating valve connected to move with the actuating piston, a main brake pipe chamber being formed on one side of said piston and a supplemental brake pipe chamber being formed on the opposite side of said piston, an emergency piston in the main brake pipe chamber and forming one wall of a quick-action chamber, this latter chamber being connected to a brake pipe reservoir, the main slide valve being provided with ports which, in the release and charging position of the main slide valve, permit air to flow to the brake pipe reservoir and to the quick-action chamber, means connecting the actuating piston to the emergency piston whereby the latter will have a slight independent movement, a replacing spring acting on the actuating piston, the emergency piston being larger in diameter than the actuating piston whereby an increase of pressure in the main brake pipe chamber will cause the emergency piston to move the actuating piston and the slide valve to charging position and whereby an equalization of pressures in the main brake pipe chamber and in the quick-action chamber will permit the actuating piston to be moved by the replacing spring to shift the graduating valve and open the emergency reservoir charging ports.

42. A triple valve for an air brake apparatus comprising a main service slide valve, an actuating piston connected to said slide valve and having a slight independent movement, a graduating valve connected to said piston to move therewith and mounted on the main slide valve, a main brake pipe chamber being formed on one side of said actuating piston and a suppplemental brake pipe chamber formed on the opposite side of said piston, an emergency slide valve and emergency piston subject on one side to the pressure in the main brake pipe chamber and on its opposite side to the pressure in a quick-action chamber, this latter chamber being connected to a brake pipe reservoir, means connecting the emergency piston to the emergency valve said means permitting a slight independent movement of the emergency piston, means connecting the main actuating piston to the emergency piston, said means permitting a slight independent relative movement of said pistons, a replacing spring in the main brake pipe chamber adapted to engage and move the actuating piston upon an equalization of pressures in the main brake pipe chamber and in the quick-action chamber, an emergency spring operating on the emergency slide valve to hold said valve against movement except when moved to emergency position by the emergency piston, and a service lap spring adapted to move the graduating valve to service lap position upon an equalization of pressures in the main brake pipe chamber and in the supplemental brake pipe chamber.

43. A triple valve in accordance with claim 42, combined with a pilot valve controlling communication between the brake pipe and the supplemental brake pipe chamber, said pilot valve being controlled by brake pipe pressure.

44. A triple valve in accordance with claim 42, combined with an emergency reservoir and a pilot valve subject to brake pipe and emergency reservoir pressures and controlling communication between the brake pipe and the supplemental brake pipe chamber, the graduating valve operating to open communication between the supplemental brake pipe chamber and the emergency reservoir upon an equalization of pressures in the main brake pipe chamber and in the quick-action chamber.

45. A triple valve in accordance with claim 44, the pilot valve operating upon a reduction of brake pipe pressure to exhaust air from the supplemental brake pipe chamber to the brake cylinder to permit the pressure in the main brake pipe chamber to move the actuating piston and the main slide valve and graduating valve inwardly to application position, the main slide valve placing the brake pipe in communication with the supplemental brake pipe chamber and with the brake cylinder, and also placing the brake pipe reservoir in communication with the brake cylinder and opening communication between the emergency reservoir and the main slide valve chamber, the approximate equalization of pressures in the supplemental and main brake pipe chambers stopping the slide valve and graduating valve in service positions, the pilot valve closing communication between the brake cylinder and the supplemental brake pipe chamber when the desired degree of pressure is built up in the brake cylinder, and the service lap spring moving the graduating valve to lap position upon a full equalization of pressures in the main and supplemental brake pipe chambers.

46. A triple valve in accordance with claim 45, combined with a release governing valve which in quick-release position will permit emergency reservoir air to flow to the supplemental brake pipe chamber upon an increase of brake pipe pressure to thereby move the actuating piston and the connected valves to full-release position to exhaust brake cylinder and permit emergency reservoir air to flow to the brake pipe.

47. In an air brake apparatus, a brake pipe, a brake cylinder, a slide valve device controlling communication between the brake pipe and the brake cylinder, a piston connected thereto and subject on both sides to air under pressure and operating upon a reduction of brake pipe pressure to open communication between the brake pipe and the brake cylinder, and means operated by brake cylinder pressure to cause the slide valve device to close communication between the brake pipe and the brake cylinder.

48. An air brake apparatus comprising a brake pipe, a brake cylinder, a slide valve device controlling communication between the brake pipe and the brake cylinder, a piston operating said valve device, means operating upon a reduction of brake pipe pressure to cause the piston and slide valve device to move and open communication between the brake pipe and brake cylinder, and means controlled by brake cylinder and brake pipe pressures to move the slide valve device to close communication between the brake cylinder and brake pipe when the required pressure is in the brake cylinder.

49. An air brake apparatus comprising a brake pipe, a brake cylinder, a valve controlling communication between the brake pipe and brake cylinder, and means operating upon a reduction of brake pipe pressure to cause the reduced brake pipe pressure to move said valve to open communication between the brake pipe and brake cylinder for an application of the brakes.

50. In an air brake apparatus, a brake pipe, a brake cylinder, a main slide valve and a graduating valve, a piston connected thereto and subject on both sides to air under pressure and operating upon a reduction of brake pipe pressure to move the main slide valve and graduating valve to open communication between the brake pipe and the brake cylinder, and means operated by brake cylinder pressure to cause the graduating valve to close communication between the brake pipe and the brake cylinder.

51. In an air brake apparatus, a brake pipe, a brake cylinder, a main slide valve and a graduating valve, a piston connected thereto and subject on both sides to air under pressure, means operating upon a reduction of brake pipe pressure to exhaust the air from one side of said piston to permit the air on the other side of said piston to move the main slide valve and graduating valve to open communication between the brake pipe and the brake cylinder for an application of the brakes, and means operated by brake cylinder pressure to cause the graduating valve to close communication between the brake pipe and the brake cylinder.

52. In an air brake apparatus, a brake pipe, a brake cylinder, a main slide valve and a graduating valve, a piston connected thereto and subject on both sides to air under pressure, means operating upon a reduction of brake pipe pressure to exhaust the air from one side of said piston to permit the air on the other side of said piston to move the main slide valve and graduating valve to open communication between the brake pipe and the brake cylinder for an application of the brakes, means operating to admit air to the exhausted side of said piston to stop the main slide valve in service braking position, and means operated by brake cylinder pressure to cause the graduating valve to close communication between the brake pipe and the brake cylinder.

53. In an air brake apparatus, a brake pipe, a brake cylinder, a slide valve device controlling communication between the brake pipe and the brake cylinder, a piston connected thereto and subject on both sides to brake pipe air and adapted to be operated by reduced brake pipe pressure upon a reduction of brake pipe pressure for an application of the brakes, said valve device opening communication between the brake pipe and the brake cylinder, and means operated by brake cylinder pressure to cause said slide valve device to close communication between the brake pipe and the brake cylinder.

54. An air brake apparatus comprising a brake pipe, a brake cylinder, a slide valve device controlling communication between the brake pipe and the brake cylinder, a piston connected to and operating said valve device and subject on both of its sides to brake pipe air, means operating upon a reduction of brake pipe pressure to cause said reduced brake pipe pressure to move the piston and slide valve device and open communication between the brake pipe and the brake cylinder, and means controlled by brake cylinder and brake pipe pressures to move the slide valve device to close communication between the brake cylinder and the brake pipe when the required pressure is in the brake cylinder.

55. A braking apparatus comprising a brake pipe, a brake cylinder, means affording communication between the brake pipe and the brake cylinder and operable by reduced brake pipe pressure upon a reduction of brake pipe pressure for an application of the brakes, said means opening communication between the brake pipe and the brake cylinder for an application of the brakes by brake pipe air.

56. A braking apparatus comprising a brake pipe, a brake cylinder, means affording communication between the brake pipe and the brake cylinder and operable by reduced brake pipe pressure upon a reduction of brake pipe pressure for an application of the brakes said means opening communication between the brake pipe and the brake cylinder for an application of the brakes by brake pipe air, said means being operable by brake cylinder pressure to close communication between the brake pipe and the brake cylinder when the required pressure is in the brake cylinder.

57. An air brake apparatus comprising a triple valve, a brake cylinder, a brake pipe connected to the triple valve, a main slide valve in said triple valve, a main actuating piston connected to said slide valve, means to admit brake pipe pressure on opposite sides of the main actuating piston, and means operating upon a reduction of brake pipe pressure to exhaust brake pipe air from one side of said actuating piston to permit brake pipe air on the opposite side of said piston to move it and the main slide valve into position to admit brake pipe air to the brake cylinder.

58. A triple valve for an air brake apparatus comprising a slide valve, an actuating piston connected thereto, means for admitting air on opposite sides of said actuating piston, and means operating upon a reduction of brake pipe pressure to exhaust the air from one side of said actuating piston to permit the air on the opposite side of said piston to move said piston and the slide valve connected thereto into position to admit brake pipe air to the brake cylinder.

59. A triple valve for an air brake apparatus comprising a slide valve, an actuating piston connected thereto, means for admitting air on opposite sides of said actuating piston, means operating upon a reduction of brake pipe pressure to exhaust the air from one side of said actuating piston to permit the air on the opposite side of said piston to move said piston and the slide valve connected thereto into position to admit brake pipe air to a brake cylinder, and means operating when the slide valve is in application position to admit air to the exhausted side of the actuating piston to stop said piston and slide valve in application position.

60. A triple valve for an air brake apparatus comprising a slide valve, an actuating piston connected thereto, means for admitting air on opposite sides of said actuating piston, means operating upon a reduction of brake pipe pressure to exhaust the air from one side of said actuating piston to permit the air on the opposite side of said piston to move said piston and the slide valve connected thereto into position to admit brake pipe air to a brake cylinder, and means controlled by brake cylinder pressure to cause the slide valve to move to lap position.

61. A triple valve for air brake apparatus, comprising a slide valve, an actuating piston therefor, means operating upon a reduction of brake pipe pressure to cause the piston and the slide valve to move inwardly to connect the brake pipe to the brake cylinder for an application of the brakes, and means operating upon an increase of brake pipe pressure to cause the actuating piston and the slide valve to move outwardly to release position.

62. A triple valve comprising a slide valve and an actuating piston adapted to be moved in one direction by brake pipe pressure upon a reduction of brake pipe pressure for an application of the brakes, said valve connecting the brake pipe to the brake cylinder for braking purposes, and means operating upon an increase of brake pipe pressure to cause said actuating piston to be moved in the opposite direction against brake pipe pressure and to thereby move the slide valve to release position.

63. An air brake apparatus comprising a brake pipe, a brake cylinder, an emergency reservoir, a main slide valve and a graduating valve, a piston connected to said valves and subject on both sides to air under pressure, a pilot valve subject to brake pipe emergency reservoir and brake cylinder pressures and controlling the movements of the main slide valve, the graduating valve, and the piston connected thereto.

64. An air brake apparatus comprising a brake pipe, a brake cylinder, an emergency reservoir, a slide valve, an actuating piston therefor adapted to be moved in one direction by brake pipe pressure for an application of the brakes and to be moved in the opposite direction for a release of the brakes, and a pilot valve subject to brake pipe emergency reservoir and brake cylinder pressures and controlling the movements of the slide valve and actuating piston.

65. A triple valve for air brake apparatus comprising a slide valve, an actuating piston connected thereto, means for admitting brake pipe air on opposite sides of said actuating piston, and means operating upon a reduction of brake pipe pressure on one side of said piston to exhaust the air from the other side of said actuating piston to thereby permit the reduced brake pipe pressure to move said piston and the slide valve connected thereto into position to admit air to a brake cylinder.

66. A triple valve comprising a main slide valve, a graduating valve, an emergency slide valve, an actuating piston for the main and graduating valve, an emergency piston for the emergency valve, and means whereby the emergency piston may move during service applications of the brakes without moving the emergency slide valve.

67. A triple valve comprising a main slide valve, a graduating valve, an emergency slide valve, an actuating piston for the main and graduating valve, an emergency piston for the emergency valve, and means operating upon a sudden reduction of brake pipe pressure to move the emergency piston sufficiently to operate the emergency slide valve and the main slide valve to their emergency positions.

68. A triple valve formed with a main brake pipe chamber and comprising a main slide valve, a graduating valve, an emergency slide valve, an actuating piston for the main and graduating valves, an emergency piston for the emergency valve, and means operating upon a sudden reduction of brake pipe pressure in the main brake pipe chamber to move the emergency piston sufficiently to operate the emergency slide valve and the main and graduating valves to their emergency positions, the emergency valve in its emergency position venting the brake pipe to atmosphere and sealing the main brake pipe chamber from the brake pipe and connecting the said chamber to a brake cylinder port.

69. A triple valve formed with a main brake pipe chamber and comprising a main slide valve, a graduating valve, an emergency slide valve, an actuating piston for the main and graduating valves, an emergency piston for the emergency valve, means operating upon a sudden reduction of brake pipe pressure in the main brake pipe chamber to move the emergency piston sufficiently to operate the emergency slide valve and the main and graduating valves to their emergency positions, the emergency valve in its emergency position venting the brake pipe to atmosphere and sealing the main brake pipe chamber from the brake pipe and connecting the said chamber to a brake cylinder port, and means for moving the emergency slide valve to close the vent from the brake pipe a predetermined time after the emergency reduction in brake pipe pressure.

70. In an air brake apparatus, the combination of a brake pipe, a brake pipe reservoir, and a triple valve comprising a casing having main and supplemental brake pipe pressure chambers, an abutment subject on opposite sides to the pressure in said chambers, a valve operable by said abutment, and means operating upon a service reduction of brake pipe pressure in the main chamber to exhaust air from the supplemental chamber and permit the reduced brake pipe pressure in the main chamber to move said abutment and cause the valve to move to a position to admit air from the brake pipe to a brake cylinder.

71. In an air brake system, the combination of a brake pipe, a brake cylinder, a brake pipe reservoir, an emergency reservoir, and a triple valve comprising a casing having main and supplemental brake pipe pressure chambers, an abutment subject on opposite sides to the normally equalized brake pipe pressure in said chambers, a valve operable by said abutment and governing a passage connecting the brake pipe reservoir with the brake cylinder and a brake cylinder exhaust passage, means operating upon a service reduction of brake pipe pressure in the main chamber to vent the supplemental chamber and permit the abutment to be moved by the reduced brake pipe pressure in the main chamber to move said valve to brake application position, and means operating upon an increase in brake pipe pressure after a service application of the brakes to admit air from said emergency reservoir to the supplemental chamber to move the abutment and valve to brake release position.

72. An air brake apparatus comprising an emergency reservoir, a brake pipe reservoir, a brake cylinder, a brake pipe, a triple valve, and means operating upon an increase in brake pipe pressure to charge the brake pipe reservoir, said means operating upon an equalization of brake pipe and brake pipe reservoir pressures to open communication between the brake pipe reservoir and the emergency reservoir to charge the emergency reservoir.

73. An air brake apparatus comprising an emergency reservoir, a brake pipe reservoir, a brake cylinder, a brake pipe, and means operating upon an increase of brake pipe pressure to open communication between the brake pipe and the brake pipe reservoir for charging the same, said means closing communication between the brake pipe reservoir and the emergency reservoir, and operating upon an equalization of pressures in the brake pipe reservoir and the brake pipe to open communication between the brake pipe reservoir and the emergency reservoir for charging the same.

74. An air brake apparatus comprising an emergency reservoir, a brake pipe reservoir, a brake cylinder, a brake pipe, means operating upon an increase of brake pipe pressure to open communication between the brake pipe and the brake pipe reservoir for charging the same, said means closing communication between the brake pipe reservoir and the emergency reservoir and operating upon an equalization of pressures in the brake pipe reservoir and the brake pipe to open communication between the brake pipe reservoir and the emergency reservoir for charging the same, and means for automatically discharging through the brake cylinder excess brake pipe reservoir pressure when the brake pipe pressure is at normal running pressure.

75. An air brake apparatus comprising an emergency reservoir, a brake pipe reservoir, a brake cylinder, a brake pipe, means operating upon an increase of brake pipe pressure to open communication between the brake pipe and the brake pipe reservoir for charging the same, said means closing communication between the brake pipe reservoir and the emergency reservoir and operating upon an equalization of pressures in the brake pipe reservoir and the brake pipe to open communication between the brake pipe reservoir and the emergency reservoir for charging the same, and means for automatically discharging excess brake pipe reservoir pressure when the brake pipe pressure is at normal running pressure.

76. In an air brake system the combination of a brake pipe, a brake cylinder, a brake pipe reservoir, an emergency reservoir, and a triple valve comprising a casing having main and supplemental brake pipe pressure chambers, an abutment subject on opposite sides to the normally equalized pressures in said chambers, a valve operable by the abutment and governing communication between the brake pipe reservoir and brake cylinder, between the brake pipe and emergency reservoir and between the brake cylinder and an exhaust port, means operating upon a service reduction in brake pipe pressure to vent the supplemental chamber and permit the abutment to be moved by the reduced pressure in the main chamber to cause the valve to open communication between the brake pipe reservoir and brake cylinder, and means operating upon an increase in brake pipe pressure after a service application to open communication between the emergency reservoir and the supplemental chamber to permit the abutment and valve to be moved by pressure supplied from the emergency reservoir to a position opening communication between the emergency reservoir and the brake pipe and between the brake cylinder and its exhaust port.

77. A triple valve, means therein operating upon a reduction of brake pipe pressure to admit air to the brake cylinder for an application of the brakes and operating upon an increase of brake pipe pressure to release the brakes, a quick-release valve having an active and an inactive position and controlling the release operations of said means whereby when said quick-release valve is rendered inactive the said means will be inoperative in release operations, and an independent valve operating upon an increase of brake pipe pressure to exhaust the brake cylinder pressure.

78. An air brake apparatus comprising an emergency reservoir, a brake pipe, a brake pipe reservoir, a brake cylinder, a triple valve having means therein operating upon a reduction of brake pipe pressure to admit air to the brake cylinder and upon an increase in brake pipe pressure to release brake cylinder pressure, and a manually operable quick-release valve interposed in said means and controlling communication between the emergency reservoir and the brake pipe and the brake cylinder and atmosphere.

79. An air brake apparatus provided with means operating upon an increase of brake pipe pressure to slowly release brake cylinder pressure at a uniform rate without regard to the degree of increased brake pipe pressure.

80. A triple valve for an air brake apparatus comprising a main slide valve, a graduating valve, a piston connected to and operating said valves, and means operating upon an increase of brake pipe pressure to slowly release brake cylinder pressure at a uniform rate and independently of the main slide valve without regard to the degree of increased brake pipe pressure.

81. An air brake apparatus comprising a brake pipe, a brake pipe reservoir, an emergency reservoir, a triple valve, means therein operating upon an increase of brake pipe pressure to charge the brake pipe reservoir, said means preventing the charging of the emergency reservoir with a rising brake pipe pressure, whereby an overcharge of the emergency reservoir is prevented.

82. A triple valve provided with a main slide valve, a pilot valve and a quick-release valve, the main slide valve cooperating with the quick-release valve in quick-release operation and operating idly in release operations when the quick-release valve is inoperative, the pilot valve operating at all times in release operations to slowly exhaust the brake cylinder pressure.

83. A triple valve provided with a main slide valve, a quick-release valve adapted to be manually operated to render the main slide valve idle in release operations, and a secondary or pilot valve adapted to slowly release brake cylinder pressure upon an increase of brake pipe pressure for a release of the brakes.

84. An air brake apparatus comprising a brake pipe, an emergency reservoir, a brake pipe reservoir, and provided with means for slowly charging the emergency reservoir upon an equalization of pressures in the brake pipe and brake pipe reservoir.

85. An air brake apparatus comprising a brake pipe, an emergency reservoir, a brake pipe reservoir, and provided with means for closing communication between the brake pipe reservoir and the emergency reservoir when the rate of rise of brake pipe pressure exceeds the rate of flow between the brake pipe reservoir and the emergency reservoir.

86. An air brake apparatus in which the brake pipe pressure may be rapidly increased throughout the length of the train without varying the rate of brake cylinder release throughout the length of the train.

87. A triple valve, means therein operating upon a reduction of brake pipe pressure to admit air to the brake cylinder for an application of the brakes, a manually operable release governing valve controlling the release operations of said means when the brake pipe pressure is increased for a release of the brakes, said release governing valve in one position rendering the said means idle in release operations, and an independent valve operating upon an increase of brake pipe pressure to slowly exhaust the brake cylinder pressure.

88. A triple valve comprising a main slide valve, a graduating valve, an actuating piston operatively connected to said valves, and a pilot valve controlled in its operations by brake pipe and brake cylinder pressures and the pressure of an emergency reservoir and controlling the application and release operations of the main slide valve and graduating valve.

89. In an air brake apparatus, a brake pipe, a brake pipe reservoir, a triple valve comprising a casing having main and supplemental brake pipe chambers, an abutment subject on opposite sides to the pressures in said chambers, a valve operable by said abutment, and a pilot valve operating upon a reduction of brake pipe pressure in the main chamber to connect the supplemental brake pipe chamber to a brake cylinder thereby to permit the reduced brake pipe pressure in the main chamber to move said abutment and the valve connected thereto to a position to admit air from the brake pipe to a brake cylinder.

90. In an air brake apparatus, a brake pipe, a brake pipe reservoir, a triple valve comprising a casing having main and supplemental brake pipe chambers, an abutment subject on opposite sides to the pressures in said chambers, a valve operable by said abutment, a pilot valve operating upon a reduction of brake pipe pressure in the main chamber to connect the supplemental brake pipe chamber to a brake cylinder thereby to permit the reduced brake pipe pressure in the main chamber to move said abutment and the valve connected thereto to a position to admit air from the brake pipe to a brake cylinder, and means adapted to be operated by brake pipe, brake cylinder and emergency reservoir pressures to move the pilot valve to lap position.

91. An air brake apparatus comprising a brake pipe, a brake cylinder, an emergency reservoir, a triple valve provided with main and supplemental brake pipe chambers, an abutment dividing said chambers and subject on opposite sides to the pressures in said chambers, a main slide valve and a graduating valve operable by said abutment, a pilot valve operating upon a reduction of brake pipe pressure in the main chamber to connect the supplemental brake pipe chamber to the brake cylinder thereby to permit the pressure in the main chamber to move the abutment and the valves connected thereto to connect the brake pipe to the brake cylinder for an application of the brakes and to connect the brake pipe with the supplemental chamber through the slide valve and graduating valve, means operable by brake pipe, brake cylinder and emergency reservoir pressures to move the pilot valve to lap position, to close communication between the supplemental brake pipe chamber and brake cylinder, and means for moving the graduating valve to lap position to close communication between the brake pipe and the supplemental brake pipe chamber when the pressures in the main and supplemental chambers have equalized.

92. An air brake apparatus in accordance with claim 91 and wherein brake pipe air is admitted to the chamber containing the main and graduating valves to hold said valves to their seats during a service application of the brakes.

93. An air brake apparatus in accordance with claim 91 and wherein the pilot valve upon an increase of brake pipe pressure after an application of the brakes will connect the emergency reservoir to the supplemental brake pipe chamber thereby to permit the emergency reservoir air to force the abutment and the valves connected thereto to full-release position.

94. An air brake apparatus in accordance with claim 93 and wherein means are provided to permit the emergency reservoir air to enter the chamber containing the main and graduating valves to hold said valves to their seats in the release operation of the valves.

95. An air brake apparatus in accordance with claim 91 and provided with an emergency pilot valve, an emergency slide valve, an emergency abutment operably connected to the emergency slide valve, said emergency abutment being subject on one side to the pressure in the main brake pipe chamber and on its other side to the pressur in a quick-action chamber, and means whereby upon a reduction of pressure in the brake pipe below a predetermined degree after a service application of the brakes said emergency pilot valve will be automatically operated to connect the emergency reservoir to the quick-action chamber to thereby force the emergency abutment and said emergency slide valve and also the main and graduating valves to emergency position.

96. An air brake apparatus in accordance with claim 95 and wherein the emergency valve in emergency position will vent the brake pipe to atmosphere and will connect the emergency reservoir and the brake cylinder to the main brake pipe chamber.

97. An air brake apparatus in accordance with claim 96 and provided with means for moving the emergency valve to close the brake pipe vent when the pressures in the quick-action chamber and in the main brake pipe chamber have equalized.

98. An air brake apparatus comprising a brake pipe, a brake cylinder, an emergency reservoir, a triple valve operating upon a reduction of brake pipe pressure to connect the brake pipe to the brake cylinder for an application of the brakes by brake pipe air, and means operating upon an increase of brake pipe pressure after an application of the brakes to admit emergency reservoir air to the triple valve to move said triple valve to full-release position against the rising brake pipe pressure.

99. An air brake apparatus comprising a brake pipe, a brake cylinder, an emergency reservoir, a triple valve operating upon a reduction of brake pipe pressure to move to application position to admit air to the brake cylinder for an application of the brakes, and means operating upon an increase of brake pipe pressure after an application of the brakes to admit emergency reservoir air to the triple valve to move said triple valve to release position against the rising brake pipe pressure.

100. An air brake apparatus in accordance with claim 99 and provided with a manually operable valve which controls communication between the emergency reservoir and the interior of the triple valve for release operations of the triple valve.

101. In an air brake apparatus, a brake pipe, a brake pipe reservoir, a triple valve comprising a main slide valve, a graduating valve, an actuating piston operatively connected to said valves and subject on opposite sides to air pressure and operating upon a slow reduction of brake pipe pressure on one side thereof to move the said valves to connect the brake pipe and the brake pipe reservoir to the brake cylinder for a service application of the brakes, and means controlled by brake cylinder pressure to cause the graduating valve to close communication between the brake pipe the brake pipe reservoir and the brake cylinder when the desired degree of pressure is in the brake cylinder.

102. In an air brake apparatus, a brake pipe, a brake pipe reservoir, an emergency reservoir, a triple valve comprising a main slide valve, a graduating valve, an actuating piston operatively connected to said valves and subject on opposite sides to air pressure and operating upon a slow reduction of brake pipe pressure on one side thereof to move the said valves to connect the brake pipe and the brake pipe reservoir to the brake cylinder for a service application of the brakes, and means operating upon a sudden reduction in brake pipe pressure to move said valves to emergency position thereby to seal the brake pipe reservoir from the brake pipe and to connect the emergency reservoir to the brake cylinder.

103. In an air brake apparatus, a brake pipe, a brake pipe reservoir, a triple valve provided with main and supplemental brake pipe chambers, a movable abutment separating said chambers and subject on opposite sides to the pressures in said chambers, a main slide valve and a graduating valve operatively connected to said abutment, and a pilot valve operating upon a service reduction of brake pipe pressure in the main chamber to connect the supplemental brake pipe chamber to the brake cylinder thereby to permit the reduced brake pipe pressure in the main chamber to move said abutment and the valves connected thereto into position to connect the brake pipe and the brake pipe reservoir to the brake cylinder for a service application of the brakes and to connect the brake pipe to the supplemental brake pipe chamber to arrest the main and graduating valves in service-application position.

104. In an air brake apparatus, a brake pipe, a brake pipe reservoir, a triple valve provided with main and supplemental brake pipe chambers, a movable abutment separating said chambers and subject on opposite sides to the pressures in said chambers, a main slide valve and a graduating valve operatively connected to said abutment, a pilot valve operating upon a service reduction of brake pipe pressure in the main chamber to connect the supplemental brake pipe chamber to the brake cylinder thereby to permit the reduced brake pipe pressure in the main chamber to move said abutment and the valves connected thereto into position to connect the brake pipe and the brake pipe reservoir to the brake cylinder for a service application of the brakes and to connect the brake pipe to the supplemental brake pipe chamber to arrest the main and graduating valves in service-application position, means subject to emergency reservoir brake pipe and brake cylinder pressures to move the pilot valve to lap position when the desired pressure is in the brake cylinder to thereby permit of an equalization of pressures in the main and supplemental brake pipe chambers, and means to move the graduating valve to lap position upon said equalization of pressures.

105. In an air brake apparatus, a brake pipe, a brake pipe reservoir, an emergency reservoir, a triple valve provided with main and supplemental brake pipe chambers, a movable abutment separating said chambers and subject on opposite sides to the pressures in said chambers, a main slide valve and a graduating valve operatively connected to said abutment, a pilot valve operating upon a reduction of brake pipe pressure in the main chamber to connect the supplemental brake pipe chamber to the brake cylinder thereby to permit the reduced brake pipe pressure in the main chamber to move said abutment and the valves connected thereto into position to connect the brake pipe and the brake pipe reservoir to the brake cylinder for a service application of the brakes and to connect the brake pipe to the supplemental brake pipe chamber to arrest the movement of the main and graduating valves, and means operating upon a sudden reduction in brake pipe pressure to move the main and graduating valves to seal the brake pipe reservoir and connect the emergency reservoir to the brake cylinder.

106. In an air brake apparatus, a brake pipe, a brake pipe reservoir, an emergency reservoir, a triple valve provided with main and supplemental brake pipe chambers, a movable abutment separating said chambers and subject on opposite sides to the pressures in said chambers, a main slide valve and a graduating valve operatively connected to said abutment, a pilot valve operating upon a reduction of brake pipe pressure in the main chamber to connect the supplemental brake pipe chamber to the brake cylinder thereby to permit the reduced brake pipe pressure in the main chamber to move said abutment and the valves connected thereto into position to connect the brake pipe and the brake pipe reservoir to the brake cylinder for a service application of the brakes and to connect the brake pipe to the supplemental brake pipe chamber to arrest the movement of the main and graduating valves, an emergency valve, an emergency piston operably connected thereto and forming one wall of a quick-action chamber and operating upon a sudden reduction in brake pipe pressure to move the main and graduating valves to seal the brake pipe reservoir and to connect the emergency reservoir with the brake cylinder and the supplemental brake pipe chamber and the quick-action chamber and to move the emergency valve to open communication between the emergency reservoir and the main brake pipe chamber and from said main brake pipe chamber to the brake cylinder and to vent the brake pipe to atmosphere, and a check valve to prevent flow of air from the quick-action chamber to the brake pipe chamber, a small leak port being formed around said check valve.

107. In an air brake apparatus, a brake pipe, a brake pipe reservoir, a triple valve comprising a main slide valve, a graduating valve, an actuating piston operatively connected to said valves and subject on opposite sides to air pressure and operating upon a slow reduction of brake pipe pressure on one side thereof to move the said valves to connect the brake pipe and the brake pipe reservoir to the brake cylinder for a service application of the brakes, and means to cause the graduating valve to close communication between the brake pipe the brake pipe resevoir and the brake cylinder when the desired degree of pressure is in the brake cylinder.

108. In an air brake apparatus, a brake pipe, a brake pipe reservoir, a triple valve comprising a main slide valve, a graduating valve, an actuating piston operatively connected to said valves and subject on opposite sides to air pressure and operating upon a slow reduction of brake pipe pressure on one side thereof to move the said valves to connect the brake pipe and the brake pipe reservoir to the brake cylinder for a service application of the brakes and means to cause an equalization of pressures on opposite sides of the actuating piston when the desired brake cylinder pressure has been obtained, and means to cause the graduating valve to close communication between the brake pipe the brake pipe reservoir and the brake cylinder upon an equalization of pressures on opposite sides of the said actuating piston.

109. An air brake apparatus in accordance with claim 95 and wherein the emergency pilot valve comprises an abutment which, after a service application of the brakes, is subject to brake pipe pressure on one side and to the pressure of a spring on its other side, and a valve connected to said abutment, the main slide valve in emergency position permitting pressure to equalize on both sides of the emergency pilot valve abutment thereby to permit the spring to move said abutment and the valve to open a passage to the quick-action chamber to permit emergency reservoir air to flow first to the quick-action chamber and then to the main brake pipe chamber.

110. A triple valve comprising means operating upon a slow reduction of brake pipe pressure to admit brake pipe air to a brake cylinder for a service application of the brakes and operating upon a sudden reduction in brake pipe pressure to admit air from an emergency reservoir to the brake cylinder for an emergency application of the brakes, and an automatic emergency pilot valve operating when brake pipe pressure is reduced to or below a certain pressure to admit emergency reservoir air to the triple valve to move said valve into emergency position to vent the train pipe to atmosphere and connect the emergency reservoir to the brake cylinder.

111. A triple valve for an air brake apparatus comprising a casing, a main brake pipe chamber formed therein, a main actuating abutment and an emergency abutment on opposite sides of said main brake pipe chamber, a main slide valve and a graduating valve operably connected to the main actuating abutment, an emergency valve operably connected to the emergency abutment, means operably connecting the emergency and main actuating abutments together said means permitting a slight relative independent movement, a supplemental brake pipe chamber at one side of the main actuating abutment, a quick-action chamber at one side of the emergency abutment, a pilot valve operating upon a reduction of brake pipe pressure to connect the supplemental brake pipe chamber to the brake cylinder thereby to permit the reduced brake pipe pressure in the main brake pipe chamber to move the main slide valve and graduating valve to application position and to connect the brake pipe to the brake cylinder and to connect the brake pipe to the supplemental brake pipe chamber, said pilot valve closing communication between the supplemental brake pipe chamber and the brake cylinder when there is a predetermined pressure in the brake cylinder, and means to move the graduating valve to lap position upon an equalization of pressures in the supplemental and main brake pipe chambers.

112. A triple valve in accordance with claim 111 and wherein the emergency abutment is of larger area than the main actuating abutment, whereby upon an increase of brake pipe pressure in the main brake pipe chamber the emergency abutment will move the actuating abutment and the main and graduating valves to release position.

113. A triple valve in accordance with claim 111, provided with an emergency pilot valve adapted to connect an emergency reservoir with the quick-action chamber when the main slide valve is moved to emergency position.

114. A triple valve in accordance with claim 111, provided with an automatic emergency pilot valve adapted to operate to connect an emergency reservoir to the quick-action chamber when the brake pipe pressure is reduced below a predetermined pressure.

115. A triple valve in accordance with claim 111, operating upon a slow reduction of brake pipe pressure to connect the brake pipe to the brake cylinder for a service application of the brakes and operating upon a sudden reduction in brake pipe pressure to connect an emergency reservoir to a brake cylinder for an emergency application of the brakes.

116. A triple valve for an air brake apparatus comprising a casing having a brake pipe chamber formed therein, a main actuating abutment and an emergency abutment on opposite sides of said brake pipe chamber, the emergency abutment being larger in area than the actuating abutment, a slide valve device operably connected to the main actuating abutment, an emergency valve operably connected to the emergency abutment, means operably connecting the emergency and main actuating abutments together, and means operating upon a slow reduction of brake pipe pressure to permit the reduced brake pipe pressure in the brake pipe chamber to move the main actuating abutment and the valve device to application position, the emergency abutment upon an increase of brake pipe pressure in the brake pipe chamber moving the actuating abutment and the valve device connected thereto to release position.

117. A triple valve comprising a main slide valve, a graduating valve, an emergency slide valve, an actuating piston for the main and graduating valves, and an emergency piston for the emergency valve larger in area than the actuating piston and operating upon an increase of brake pipe pressure to move the actuating piston and the main and graduating valves to release position.

118. A triple valve comprising a main slide valve, a graduating valve, an emergency slide valve, an actuating piston for the main and graduating valves, an emergency piston for the emergency valve larger in area than the actuating piston and adapted to move the actuating piston and the main and graduating valves to release position upon an increase in brake pipe pressure after a service application of the brakes, and means operating upon a sudden reduction in brake pipe pressure to move the emergency piston to operate the emergency slide valve and the main slide valve and graduating valve to emergency positions.

119. A triple valve for an air brake apparatus comprising a case having a brake pipe chamber formed therein, a main actuating abutment and an emergency abutment subject to pressure in said brake pipe chamber, the emergency abutment being larger in area than the actuating abutment, a valve device operably connected to the main actuating abutment, an emergency valve operably connected to the emergency abutment, means operably connecting together the emergency and actuating abutments, means for equalizing pressures on opposite sides of both the main and actuating abutments, and means operating upon a slow reduction of brake pipe pressure to permit the reduced brake pipe pressure in the brake pipe chamber to move the main actuating abutment and the valve device connected thereto to application position, the emergency abutment upon an increase of pressure in the brake pipe chamber moving the actuating abutment and the valve device to release position.

120. In an air brake apparatus, a brake pipe, a brake pipe reservoir, an emergency reservoir, a brake cylinder, and a triple valve comprising a main slide valve, a graduating valve, an emergency slide valve, an actuating piston for the main and graduating valve, an emergency piston for the emergency valve and larger in area than the actuating piston and adapted to move the actuating piston and the main and graduating valves to release position upon an increase in brake pipe pressure after a service application of the brakes, means operating upon a slow reduction in brake pipe pressure to permit the reduced brake pipe pressure to move the main actuating piston and the valves connected thereto into position to connect the brake pipe and the brake pipe reservoir to the brake cylinder, and means operating upon a sudden reduction of brake pipe pressure to cause the emergency piston to move the valves to connect the emergency reservoir to the brake cylinder for an emergency application of the brakes.

121. A triple valve formed with a brake pipe chamber, a main actuating abutment and an emergency abutment subject to the air pressure in said chamber, the emergency abutment being larger in area than the actuating abutment, valves connected to and operated by said abutments, means connecting together said abutments, and means operating upon a slow reduction of brake pipe pressure to permit the actuating abutment to move the valves to application position, an increase in pressure in the brake pipe chamber after a service application of the brakes, causing the emergency abutment to move the valves to release position.

122. A triple valve for air brake apparatus provided with two movable abutments of different areas, valves connected to and operated by said abutments, the smaller abutment moving the valves to application position upon a reduction in brake pipe pressure and the larger abutment moving the valves to release position upon an increase in brake pipe pressure.

123. A triple valve for air brake apparatus comprising two movable abutments of different areas, valves connected to and operated by said abutments, and means whereby the smaller abutment controls the valves in a service application of the brakes upon a gradual reduction in brake pipe pressure and the larger abutment controls the valves in an emergency application of the brakes upon a sudden reduction in brake pipe pressure and also moves the smaller abutment to release the brakes upon an increase of brake pipe pressure after a service application.

124. A triple valve for air brake apparatus comprising two movable abutments of different areas, valves connected to and operated by said abutments, means whereby the smaller abutment controls the valves in a service application of the brakes upon a gradual reduction in brake pipe pressure and the larger abutment controls the valves in an emergency application of the brakes upon a sudden reduction in brake pipe pressure and also moves the smaller abutment to release the brakes upon an increase of brake pipe pressure after a service application, and a manually adjustable valve device in the triple valve adapted to be set to admit air from a source independent of the source of air for service braking to one side of the smaller abutment upon an increase of brake pipe pressure after a service application to obtain a quick release of the brakes.

125. In an air brake apparatus, the combination of a brake cylinder, a brake pipe, an emergency reservoir, a brake pipe reservoir, and an automatic valve device operable by reduced brake pipe pressure upon a service reduction of brake pipe pressure to supply brake pipe air from the brake pipe reservoir and brake pipe to the brake cylinder, said device being operable upon an emergency reduction of brake pipe pressure to supply air from the emergency reservoir to the brake cylinder and to close communication between the brake pipe and brake pipe reservoir.

126. In an air brake apparatus, the combination of a brake cylinder, a brake pipe, an emergency reservoir, a brake pipe reservoir, and an automatic valve device operable by reduced brake pipe pressure upon a service reduction of brake pipe pressure to supply brake pipe air from the brake pipe reservoir and brake pipe to the brake cylinder, said device being operable upon an emergency reduction of brake pipe pressure to supply air from the emergency reservoir to the brake cylinder and to close communication between the brake pipe and brake pipe reservoir and open communication between the brake pipe reservoir and brake cylinder.

127. In an air brake apparatus, the combination of a brake cylinder, a brake pipe, an emergency reservoir, a brake pipe reservoir, and an automatic valve device operable by reduced brake pipe pressure upon a service reduction of brake pipe pressure to supply brake pipe air from the brake pipe reservoir and brake pipe to the brake cylinder, said device being operable upon an emergency reduction of brake pipe pressure to supply air from the emergency reservoir to the brake cylinder and to close communication between the brake pipe and brake pipe reservoir, said emergency reservoir having a non-return charging connection with the brake pipe through the valve device and said brake pipe reservoir being in open communication with the brake pipe through said valve device except during emergency operations of the valve device.

128. In an air brake apparatus, the combination of a brake cylinder, a brake pipe, a brake pipe reservoir, an emergency reservoir, and a triple valve, said triple valve having main and emergency pistons, valve devices connected with said pistons, and means whereby upon a service reduction of brake pipe pressure the main piston and its valve device will be shifted by the reduced brake pipe pressure to admit air from the brake pipe reservoir to the brake cylinder for a service application of the brakes and whereby upon an emergency reduction of brake pipe pressure both of said pistons and their connected valve devices will be shifted to admit air from the emergency reservoir to the brake cylinder and to vent the brake pipe.

129. In an air brake apparatus, the combination of a brake cylinder, a brake pipe, a brake pipe reservoir, an emergency reservoir, and a triple valve, said triple valve having main and emergency pistons, valve devices connected with said pistons, and means whereby upon a service reduction of brake pipe pressure the main piston and its valve device will be shifted by the reduced brake pipe pressure to admit air from the brake pipe reservoir to the brake cylinder for a service application of the brakes and whereby upon an emergency reduction of brake pipe pressure both of said pistons and their connected valve devices will be shifted to admit air from the emergency reservoir to the brake cylinder and to vent the brake pipe temporarily to atmosphere.

130. In an air brake apparatus, the combination of a brake cylinder, a brake pipe, a brake pipe reservoir, an emergency reservoir, and a triple valve, said triple valve having main and emergency pistons, valve devices connected with said pistons, and means whereby upon a service reduction of brake pipe pressure the main piston and its valve device will be shifted by the reduced brake pipe pressure to admit air from the brake pipe reservoir to the brake cylinder for a service application of the brakes and whereby upon an emergency reduction of brake pipe pressure both of said pistons and their connected valve devices will be shifted to admit air from the emergency reservoir to the brake cylinder and to vent the brake pipe to atmosphere and close communication between the brake pipe and brake pipe reservoir.

131. In an air brake apparatus, the combination of a brake cylinder, a brake pipe, a brake pipe reservoir, an emergency reservoir, and a triple valve, said triple valve having main and emergency pistons, valve devices connected with said pistons, means whereby upon a service reduction of brake pipe pressure the main piston and its valve device will be shifted by the reduced brake pipe pressure to admit air from the brake pipe reservoir to the brake cylinder for a service application of the brakes and whereby upon an emergency reduction of brake pipe pressure both of said pistons and their connected valve devices will be shifted to admit air from the emergency reservoir to the brake cylinder and to vent the brake pipe to atmosphere and close communication between the brake pipe and brake pipe reservoir, and means whereby brake pipe air may be admitted to one side of the emergency piston upon an increase of brake pipe pressure for a slow or graduated release of the brakes or emergency reservoir air may be admitted to one side of the main piston and to the brake pipe for a quick release of the brakes.

132. In an air brake apparatus, the combination of a brake pipe, an emergency reservoir, a brake cylinder, and a triple valve comprising a slide valve and an actuating piston therefor, means operating upon a reduction of brake pipe pressure to cause the piston and slide valve to be moved inwardly to application position by the reduced brake pipe pressure on the outer side of said piston, a release-governing valve adapted to be manually adjusted to quick-release position to admit emergency reservoir air to the inner side of the piston to move the piston and valve outwardly to release position upon an increase in brake pipe pressure, or to a normal release position closing communication between the emergency reservoir and the inner side of said piston, and means operable by rising brake pipe pressure for moving said piston and slide valve outwardly to release position when said release-governing valve is in normal release position.

133. A triple valve in accordance with claim 42, combined with a pilot valve controlling the communication between the supplement brake pipe chamber and a brake cylinder and between the brake pipe and the supplemental brake pipe chamber, said pilot valve being controlled by brake pipe pressure and brake cylinder pressure opposed to the pressure of an emergency reservoir.

134. In an air brake apparatus, the combination of a brake pipe, a brake cylinder, an emergency reservoir, and a triple valve having a quick-action chamber, a main slide valve, a graduating valve, an emergency slide valve, a main actuating piston operable by brake pipe pressure upon a gradual reduction in brake pipe pressure to move the main and graduating valves to service-application position to admit brake pipe air to the brake cylinder, an emergency piston for the emergency valve subject on opposite sides to the pressures in the brake pipe and quick-action chambers, and means whereby the emergency piston and main piston may move during service applications of the brakes upon a gradual reduction in brake pipe pressure without moving the emergency slide valve, said emergency piston being operable by the pressure in the quick-action chamber upon a sudden reduction in brake pipe pressure to move the main piston, the main slide and graduating valves, and the emergency slide valve to emergency position to admit emergency reservoir air to the brake cylinder.

135. A triple valve comprising a casing having main and supplemental brake pipe pressure chambers and a quick-action chamber, a main slide valve, a graduating valve, an emergency slide valve, a main piston for the main and graduating valves normally balanced between the pressures in the brake pipe chambers, an emergency piston for the emergency slide valve connected with the main piston and subject on opposite sides to the pressures in the main brake pipe chamber and quick-action chamber and operable upon a sudden reduction of brake pipe pressure to move the main piston and the emergency slide valve and the main slide valve and graduating valve to their emergency positions, and means operable upon a gradual reduction in brake pipe pressure for venting the supplemental brake pipe chamber to permit the reduced brake pipe pressure in the main brake pipe chamber to move the main piston and the main slide and graduating valves to service-application position.

136. A triple valve provided with a main slide valve having an exhaust port, a quick-release valve controlling the exhaust through said port in the main slide valve adapted to be manually operated to render the main slide valve idle in release operations, and a secondary or pilot valve controlling an independent restricted exhaust port adapted to slowly release brake cylinder pressure upon an increase of brake pipe pressure for a release of the brakes.

137. A triple valve provided with a main slide valve having an exhaust port, a quick-release valve controlling the exhaust through said port in the main slide valve adapted to be manually operated to render the main slide valve idle in release operations, a secondary or pilot valve controlling an independent restricted exhaust port adapted to slowly release brake cylinder pressure upon an increase of brake pipe pressure for a release of the brakes, and means controlled by brake pipe and brake cylinder pressures opposed to the pressure of an emergency reservoir for actuating said pilot valve.

138. In an air brake apparatus, the combination of a brake pipe, a brake cylinder, a brake pipe reservoir, an emergency reservoir, and a triple valve comprising a casing having main and supplemental brake pipe pressure chambers and a quick-action chamber, a main valve device, an emergency valve, a main piston connected with the main valve device normally balanced between the pressures in the brake pipe chambers, an emergency piston connected with the emergency valve and the main piston subject on opposite sides to the pressures in the main brake pipe chamber and the quick-action chamber and operable by the pressure in the quick-action chamber upon an emergency reduction in brake pipe pressure to move the main piston and the main and emergency valves to open a direct communication between the emergency reservoir and brake cylinder and to close communication between the main brake pipe chamber and the brake pipe, an automatic emergency pilot valve device having a normal position opening an indirect communication between the emergency reservoir and brake cylinder through the main valve device and main brake pipe chamber when the main valve device and emergency valve are in emergency position, said pilot valve and main valve device also governing a communication between the emergency reservoir and quick-action chamber, means whereby said pilot valve is operated to close said indirect communication between the emergency reservoir and quick-action chamber in service operations of the triple valve, and means whereby upon a reduction of brake pipe pressure below a predetermined degree after a service application of the brakes said pilot valve will be shifted to its normal position to admit emergency reservoir air to the quick-action chamber to move the main and emergency pistons and valves to emergency position for an automatic emergency application of the brakes.

139. A triple valve comprising a main piston, a main slide valve device connected to the main piston and movable thereby to service-application position upon a service reduction in brake pipe pressure, an emergency slide valve, an emergency piston larger in area than the main piston, and connections between said emergency piston and the emergency valve and main piston whereby both pistons may move during service operations without moving the emergency valve and whereby the main slide valve device and emergency valve may be moved to emergency-application position by the emergency piston upon an emergency reduction in brake pipe pressure, said emergency piston being operable by rising brake pipe pressure to move the main piston to release position against the rising brake pipe pressure upon an increase in brake pipe pressure after a service application.

140. In an air brake apparatus, the combination of a brake pipe, a brake cylinder, an emergency reservoir, a brake pipe reservoir, and a triple valve having piston-operated main and emergency slide valve devices and governing ports and passages between said reservoirs and the brake pipe and brake cylinder and between the brake cylinder and atmosphere, said triple valve having a pilot valve device therein controlled by brake pipe and brake cylinder pressures opposed to the emergency reservoir pressure for governing the movements of said piston-operated slide valve devices.

141. An air brake apparatus in accordance with claim 140, in which the pilot valve device is provided with a restricted passage adapted to connect the brake cylinder with atmosphere upon an increase of brake pipe pressure after an application of the brakes to slowly exhaust the brake cylinder at a uniform rate irrespective of the rate of rise of brake pipe pressure.

142. In an air brake apparatus, the combination of a brake cylinder, a brake pipe, a brake pipe reservoir, an emergency reservoir, and a triple valve device for controlling communication between said reservoirs and the brake pipe and between said reservoirs and the brake cylinder, said valve device comprising connected relatively movable main and emergency pistons, slide valve devices operable by said pistons, means whereby upon a service reduction of brake pipe pressure said main piston will be moved by the reduced brake pipe pressure to open communication between the brake pipe reservoir and brake cylinder, and means whereby upon an emergency reduction of brake pipe pressure said emergency piston will be moved by the air pressure in a quick-action chamber to shift its associated slide valve device and the main piston and its associated slide valve device to close communication between the brake pipe and brake pipe reservoir and temporarily vent the brake pipe to atmosphere and to open communication between both the emergency reservoir and brake pipe reservoir and the brake cylinder.

143. In an air brake apparatus, the combination of a brake cylinder, a brake pipe, a brake pipe reservoir, an emergency reservoir, and a triple valve device for controlling communication between said reservoirs and the brake pipe and between said reservoirs and the brake cylinder, said valve device comprising connected relatively movable main and emergency pistons, slide valve devices operable by said pistons, means whereby upon a service reduction of brake pipe pressure said main piston will be moved by the reduced brake pipe pressure to open communication between the brake pipe reservoir and brake cylinder, and means whereby upon an emergency reduction of brake pipe pressure said emergency piston will be moved by the air pressure in a quick-action chamber to shift its associated slide valve device and the main piston and its associated slide valve device to vent the brake pipe and open communication between the emergency reservoir and brake cylinder.

144. In an air brake apparatus, the combination of a brake cylinder, a brake pipe, a brake pipe reservoir, an emergency reservoir, and a triple valve device for controlling communication between the brake cylinder and atmosphere and between said reservoirs and the brake pipe and between said reservoirs and the brake cylinder, said valve device comprising connected relatively movable main and emergency pistons, slide valve devices operable by said pistons, means whereby upon a service reduction of brake pipe pressure said main piston will be moved by the reduced brake pipe pressure to open communication between the brake pipe reservoir and brake cylinder, means whereby upon an emergency reduction of brake pipe pressure said emergency piston will be moved by the air pressure in a quick-action chamber to shift its associated slide valve device and the main piston and its associated slide valve device to vent the brake pipe and open communication between the emergency reservoir and brake cylinder, and a release-governing device adapted to be manually set to either permit increasing brake pipe pressure to equalize on both sides of the main piston, or to admit emergency reservoir pressure to one side of the main piston, upon an increase of brake pipe pressure after a service application of the brakes.

145. In an air brake apparatus, the combination of a brake cylinder, a brake pipe, a brake pipe reservoir, an emergency reservoir, and a triple valve device for controlling communication between the brake cylinder and atmosphere and between said reservoirs and the brake pipe and between said reservoirs and the brake cylinder, said valve device comprising connected relatively movable main and emergency pistons, slide valve devices operable by said pistons, means whereby upon a service reduction of brake pipe pressure said main piston will be moved by the reduced brake pipe pressure to open communication between the brake pipe reservoir and brake cylinder, means whereby upon an emergency reduction of brake pipe pressure said emergency piston will be moved by the air pressure in a quick-action chamber to shift its associated slide valve device and the main piston and its associated slide valve device to vent the brake pipe and open communication between the emergency reservoir and brake cylinder, and a release-governing device adapted to be manually set to either permit increasing brake pipe pressure to equalize on both sides of the main piston or to admit emergency reservoir pressure to the brake pipe and also to one side of the main piston to move both pistons to release position upon an increase of brake pipe pressure after a service application.

146. A triple valve comprising a casing having main and supplemental brake pipe pressure chambers and a quick-action chamber, a main piston normally balanced between the pressures in the brake pipe chambers, an emergency piston of larger area than the main piston having a connection with said main piston and subject on opposite sides to the pressures in the main brake pipe chamber and quick-action chamber, a valve device connected to the main piston, a valve device having a lost-motion connection with the emergency piston, and means operable upon a service reduction of brake pipe pressure for venting the supplemental brake pipe chamber to permit the reduced brake pipe pressure in the main brake pipe chamber to move the main piston and its connected valve device to open communication between a brake pipe reservoir and a brake cylinder, said emergency piston being operable by the pressure in the quick-action chamber upon an emergency reduction of brake pipe pressure to move both pistons and the valve devices connected therewith to open communication between an emergency reservoir and brake cylinder.

147. A triple valve comprising a casing having main and supplemental brake pipe pressure chambers and a quick-action chamber, a main piston normally balanced between the pressures in the brake pipe chambers, an emergency piston of larger area than the main piston having a connection with said main piston and subject on opposite sides to the pressures in the main brake pipe chamber and quick-action chamber, a valve device connected to the main piston, a valve device having a lost-motion connection with the emergency piston, and means operable upon a service reduction of brake pipe pressure for venting the supplemental brake pipe chamber to permit the reduced brake pipe pressure in the main brake pipe chamber to move the main piston and its connected valve device to open communication between a brake pipe reservoir and a brake cylinder, said emergency piston being operable by the pressure in the quick-action chamber upon an emergency reduction of brake pipe pressure to move both pistons and the valve devices connected therewith to open communication between an emergency reservoir and brake cylinder, said valve devices controlling ports for admitting brake pipe pressure to the supplemental brake pipe chamber to move the pistons and valve devices to release position upon an increase of brake pipe pressure after an emergency application of the brakes.

148. A triple valve comprising a casing having main and supplemental brake pipe pressure chambers and a quick-action chamber, a main piston normally balanced between the pressures in the brake pipe chambers, an emergency piston of larger area than the main piston having a connection with said main piston and subject on opposite sides to the pressures in the main brake pipe chamber and quick-action chamber, a valve device connected to the main piston, a valve device having a lost-motion connection with the emergency piston, means operable upon a service reduction of brake pipe pressure for venting the supplemental brake pipe chamber to permit the reduced brake pipe pressure in the main brake pipe chamber to move the main piston and its connected valve device to open communication between a brake pipe reservoir and a brake cylinder, said emergency piston being operable by the pressure in the quick-action chamber upon an emergency reduction of brake pipe pressure to move both pistons and the valve devices connected therewith to open communication between an emergency reservoir and brake cylinder, said valve devices controlling ports for admitting brake pipe pressure to the supplemental brake pipe chamber to move the pistons and valve devices to release position upon an increase of brake pipe pressure after an emergency application of the brakes, and means whereby the triple valve may be manually adjusted to automatically admit air from the emergency reservoir to the supplemental brake pipe chamber and the brake pipe upon an increase of brake pipe pressure after a service application for a quick release of the brakes.

149. A triple valve comprising a casing having main and supplemental brake pipe pressure chambers and a quick-action chamber, a main piston normally balanced between the pressures in the brake pipe chambers, an emergency piston of larger area than the main piston having a connection with said main piston and subject on opposite sides to the pressures in the main brake pipe chamber and quick-action chamber, a valve device connected to the main piston, a valve device having a lost-motion connection with the emergency piston, means operable upon a service reduction of brake pipe pressure for venting the supplemental brake pipe chamber to permit the reduced brake pipe pressure in the main brake pipe chamber to move the main piston and its connected valve device to open communication between a brake pipe reservoir and a brake cylinder, said emergency piston being operable by the pressure in the quick-action chamber upon an emergency reduction of brake pipe pressure to move both pistons and the valve devices connected therewith to open communication between an emergency reservoir and brake cylinder, said valve devices controlling ports for admitting brake pipe pressure to the supplemental brake pipe chamber to move the pistons and valve devices to release position upon an increase of brake pipe pressure after an emergency application of the brakes, and means whereby the triple valve may be manually adjusted to automatically admit air from the emergency reservoir to the supplemental brake pipe chamber and the brake pipe upon an increase of brake pipe pressure after a service application for a quick release of the brakes or to admit brake pipe air to the main brake pipe chamber for a gradual release of the brakes.

150. A triple valve device for air brake apparatus comprising two movable abutments of different areas, valves connected to and operated by said abutments, and means whereby the smaller abutment controls the valves in service applications upon a gradual reduction in brake pipe pressure to admit air from one source of fluid pressure to a brake cylinder, and the larger abutment controls the valves in emergency applications upon a sudden reduction in brake pipe pressure to admit air from a separate source of fluid pressure to the brake cylinder and is operable by the rising brake pipe pressure upon an increase in brake pipe pressure after a service application to move the smaller abutment to release position.

151. A triple valve device for air brake apparatus comprising two movable abutments of different areas, valves connected to and operated by said abutments, and means whereby the smaller abutment controls the valves in service applications upon a gradual reduction in brake pipe pressure to admit air from one source of fluid pressure to a brake cylinder, and the larger abutment controls the valves in emergency applications upon a sudden reduction in brake pipe pressure to admit air from a separate source of fluid pressure to the brake cylinder and is operable by the rising brake pipe pressure upon an increase in brake pipe pressure after a service application to move the smaller abutment to release position, said triple valve having main and supplemental brake pipe chambers and said abutments having adjacent faces normally subject to the pressure of the main brake pipe chamber and the smaller abutment being normally subject on its opposite side to brake pipe pressure in the supplemental brake pipe chamber.

152. A triple valve device for air brake apparatus comprising two movable abutments of different areas, valves connected to and operated by said abutments, means whereby the smaller abutment controls the valves in service applications upon a gradual reduction in brake pipe pressure to admit air from one source of fluid pressure to a brake cylinder, and the larger abutment controls the valves in emergency applications upon a sudden reduction in brake pipe pressure to admit air from a separate source of fluid pressure to the brake cylinder and is operable by the rising brake pipe pressure upon an increase in brake pipe pressure after a service application to move the smaller abutment to release position, and a manually adjustable valve device in the triple valve adapted to be set to admit air from said separate source of emergency braking pressure to one side of the smaller abutment upon an increase of brake pipe pressure after a service application for a quick release of the brakes.

153. In an air brake apparatus, the combination of a brake pipe, a brake cylinder, a brake pipe reservoir, an emergency reservoir, and a triple valve comprising a casing having main and supplemental brake pipe pressure chambers and a quick-action chamber, a main valve device, an emergency valve, a main piston connected with the main valve device normally balanced between the pressures in the brake pipe chambers, an emergency piston connected with the emergency valve and the main piston subject on opposite sides to the pressures in the main brake pipe chamber and the quick-action chamber and operable by the pressure in the quick-action chamber upon an emergency reduction in brake pipe pressure to move the main piston and the main and emergency valves to open a direct communication between the emergency reservoir and brake cylinder and to close communication between the main brake pipe chamber and the brake pipe, an automatic emergency pilot valve device having a normal position opening an indirect communication between the emergency reservoir and brake cylinder through the main valve device and main brake pipe chamber when the main valve device and emergency valve are in emergency position, said pilot valve and main valve device also governing a communication between the emergency reservoir and quick-action chamber, means whereby said pilot valve is operated to close said indirect communication between the emergency reservoir and quick-action chamber in service operations of the triple valve, means whereby upon a reduction of brake pipe pressure below a predetermined degree after a service application of the brakes said pilot valve will be shifted to its normal position to admit emergency reservoir air to the quick-action chamber to move the main and emergency pistons and valves to emergency position for an automatic emergency application of the brakes, and means operable upon a service reduction of brake pipe pressure for venting the supplemental brake pipe chamber to permit the reduced brake pipe pressure in the main brake pipe chamber to move the main piston and main valve device to service position to admit air from the brake pipe reservoir to the brake cylinder.

154. In an air brake apparatus, the combination of a brake pipe, a brake cylinder, a brake pipe reservoir, an emergency reservoir, and a triple valve comprising a casing having main and supplemental brake pipe pressure chambers and a quick-action chamber, a main valve device, an emergency valve, a main piston connected with the main valve device normally balanced between the pressures in the brake pipe chambers, an emergency piston connected with the emergency valve and the main piston subject on opposite sides to the pressures in the main brake pipe chamber and the quick-action chamber and operable by the pressure in the quick-action chamber upon an emergency reduction in brake pipe pressure to move the main piston and the main and emergency valves to open a direct communication between the emergency reservoir and brake cylinder and to close communication between the main brake pipe chamber and the brake pipe, an automatic emergency pilot valve device having a normal position opening an indirect communication between the emergency reservoir and brake cylinder through the main valve device and main brake pipe chamber when the main valve device and emergency valve are in emergency position, said pilot valve and main valve device also governing a communication between the emergency reservoir and quick-action chamber, means whereby said pilot valve is operated to close said indirect communication between the emergency reservoir and quick-action chamber in service operations of the triple valve, means whereby upon a reduction of brake pipe pressure below a predetermined degree after a service application of the brakes said pilot valve will be shifted to its normal position to admit emergency reservoir air to the quick-action chamber to move the main and emergency pistons and valves to emergency position for an automatic emergency application of the brakes, means operable upon a service reduction of brake pipe pressure for venting the supplemental brake pipe chamber to permit the reduced brake pipe pressure in the main brake pipe chamber to move the main piston and main valve device to service position to admit air from the brake pipe reservoir to the brake cylinder, and means whereby the triple valve may be restored to release position upon an increase of brake pipe pressure after a service application by rising brake pipe pressure in the main brake pipe chamber and after an emergency application by rising brake pipe pressure in the supplemental brake pipe chamber.

In testimony whereof I hereunto affix my signature.

SPENCER GEARY NEAL.